United States Patent
Liu et al.

(10) Patent No.: US 10,305,571 B2
(45) Date of Patent: May 28, 2019

(54) DATA TRANSMISSION METHOD, APPARATUS AND SYSTEM, AND USER EQUIPMENT

(71) Applicant: Huawei Technologies Co., Ltd., Shenzhen (CN)

(72) Inventors: Jianqin Liu, Beijing (CN); Yongxing Zhou, Beijing (CN); Jianghua Liu, Beijing (CN); Qiang Wu, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 15/686,692

(22) Filed: Aug. 25, 2017

(65) Prior Publication Data

US 2017/0353227 A1    Dec. 7, 2017

Related U.S. Application Data

(63) Continuation of application No. PCT/CN2015/073388, filed on Feb. 28, 2015.

(51) Int. Cl.
*H04B 7/06*    (2006.01)
*H04L 5/00*    (2006.01)
(Continued)

(52) U.S. Cl.
CPC ............ *H04B 7/0691* (2013.01); *H04B 7/06* (2013.01); *H04L 5/003* (2013.01); *H04L 5/0044* (2013.01); *H04L 5/0048* (2013.01); *H04L 27/2605* (2013.01); *H04L 27/2613* (2013.01); *H04W 16/28* (2013.01); *H04W 36/00* (2013.01)

(58) Field of Classification Search
CPC .............. H04L 5/0044; H04L 27/2605; H04L 27/2613; H04B 7/0691
See application file for complete search history.

(56) References Cited

U.S. PATENT DOCUMENTS

2004/0147290 A1    7/2004    Kikuchi
2007/0081489 A1    4/2007    Anderson et al.
(Continued)

FOREIGN PATENT DOCUMENTS

CN    1519984 A    8/2004
CN    100370652 C    2/2008
(Continued)

*Primary Examiner* — David S Huang
(74) *Attorney, Agent, or Firm* — Slater Matsil, LLP

(57) ABSTRACT

A data transmission method, apparatus, and system, and user equipment are provided. The data transmission method may include determining configuration information of a first time unit in a radio time window, where the first time unit includes multiple sub-time units, a switching time period and a transmission time period are reserved in a first sub-time unit at an interval of at least N sub-time units in the first time unit, the switching time period is used to perform analog beam switching for a common channel and/or a common reference signal, and N is a natural number. The method also includes transmitting the common channel and/or the common reference signal in the first sub-time unit in the first time unit according to the configuration information of the first time unit, where the common channel and/or the common reference signal are/is transmitted in the transmission time period.

20 Claims, 12 Drawing Sheets

(51) Int. Cl.
*H04L 27/26* (2006.01)
*H04W 16/28* (2009.01)
*H04W 36/00* (2009.01)

(56) References Cited

U.S. PATENT DOCUMENTS

| | | |
|---|---|---|
| 2008/0165879 A1 | 7/2008 | Mehta et al. |
| 2008/0232325 A1 | 9/2008 | Mehta et al. |
| 2009/0225883 A1* | 9/2009 | Orlik .................. H04W 72/046 375/260 |
| 2010/0322328 A1 | 12/2010 | Schirmacher et al. |
| 2013/0121185 A1* | 5/2013 | Li ....................... H04W 72/046 370/252 |
| 2013/0315321 A1 | 11/2013 | Rajagopal et al. |
| 2014/0254515 A1 | 9/2014 | Kim et al. |
| 2016/0323757 A1* | 11/2016 | Braun .................. H04B 7/0617 |
| 2018/0074181 A1* | 3/2018 | Kishigami ............. G01S 7/282 |

FOREIGN PATENT DOCUMENTS

| | | |
|---|---|---|
| CN | 101305629 A | 11/2008 |
| CN | 101931448 A | 12/2010 |
| KR | 20050082352 A | 8/2005 |

* cited by examiner

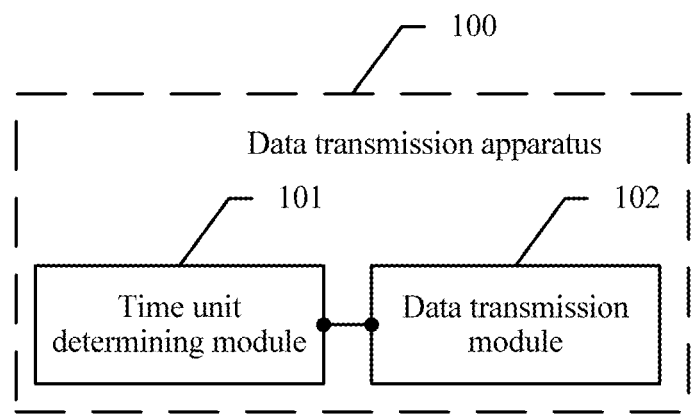
FIG. 1-a
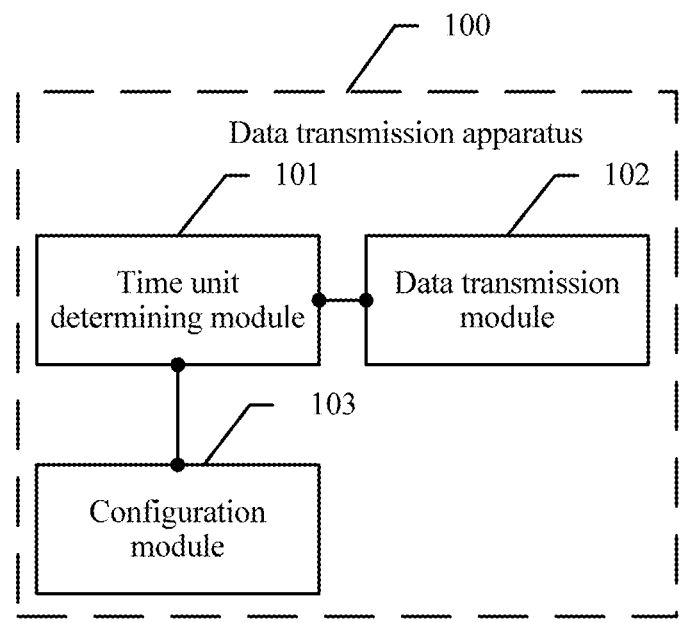
FIG. 1-b

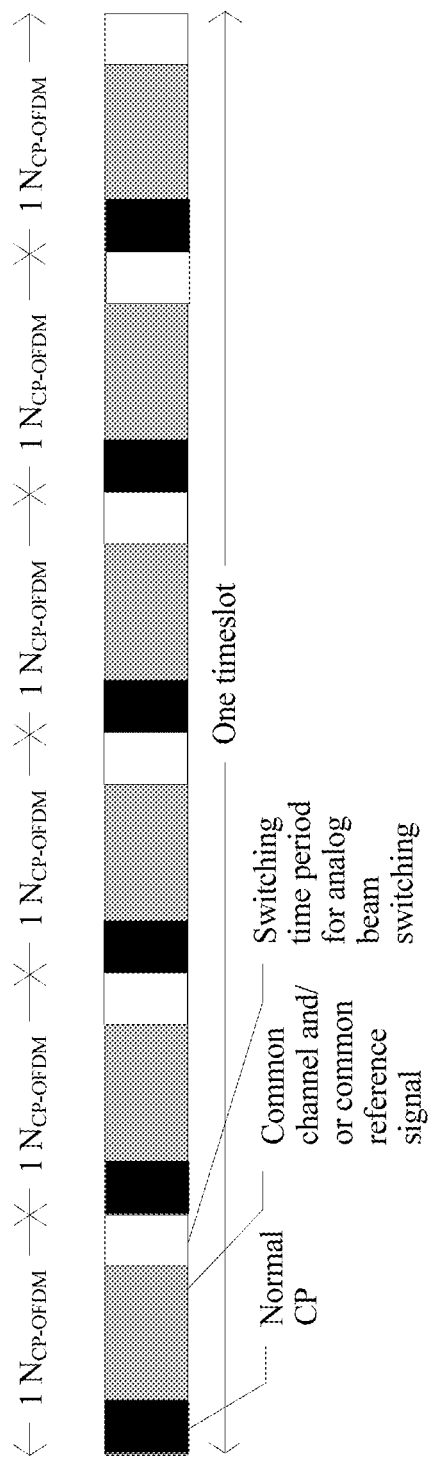
FIG. 2-a

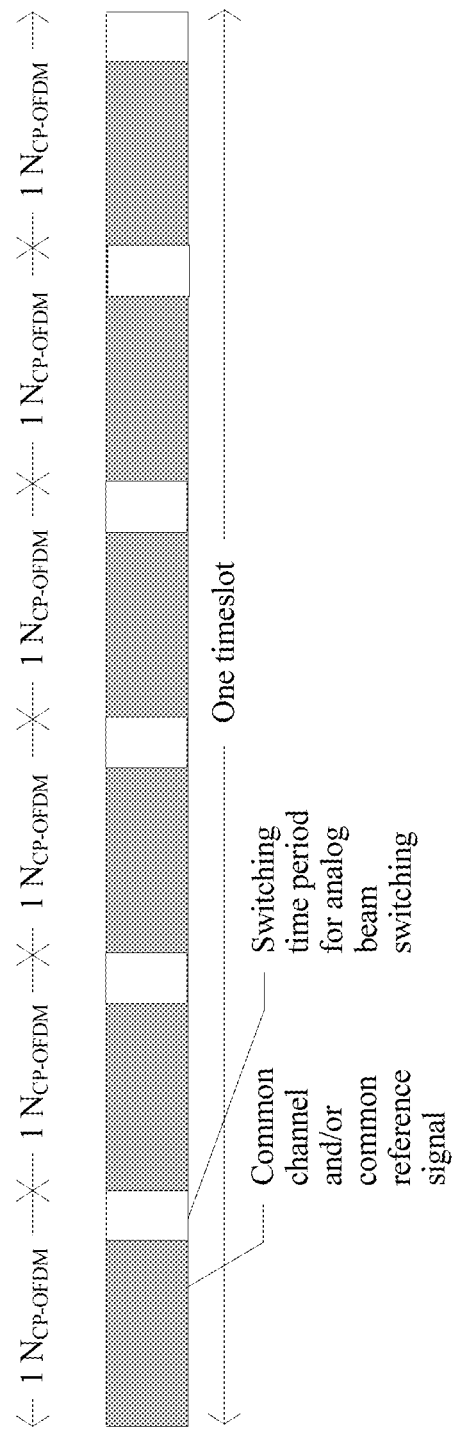
FIG. 2-b

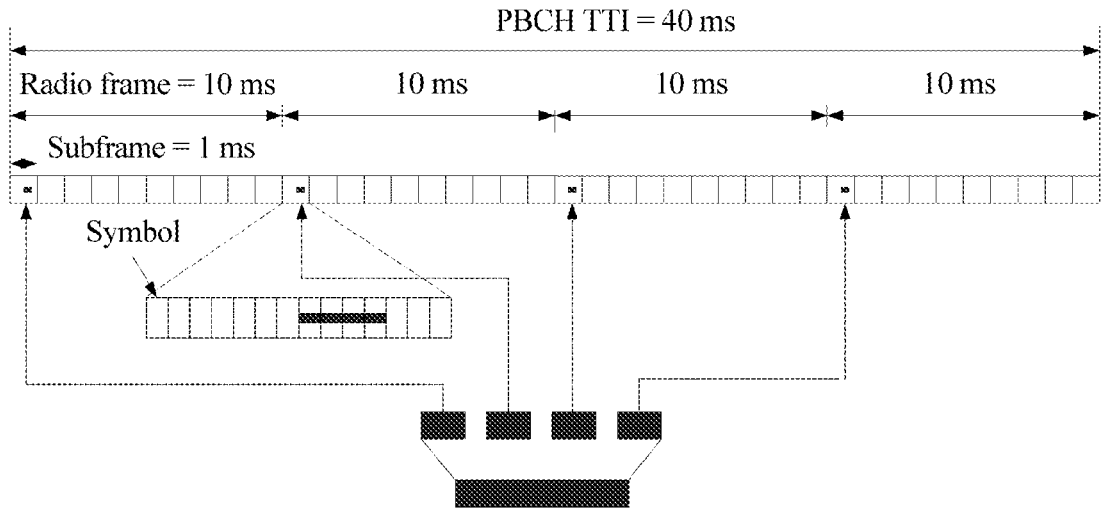
FIG. 2-c
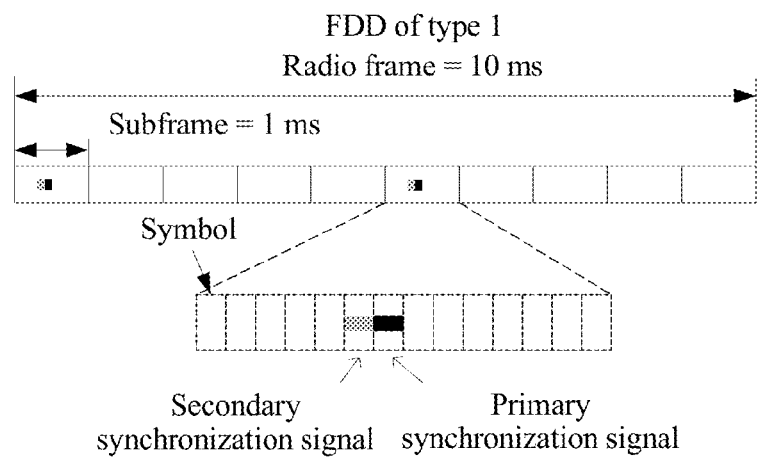
FIG. 2-d
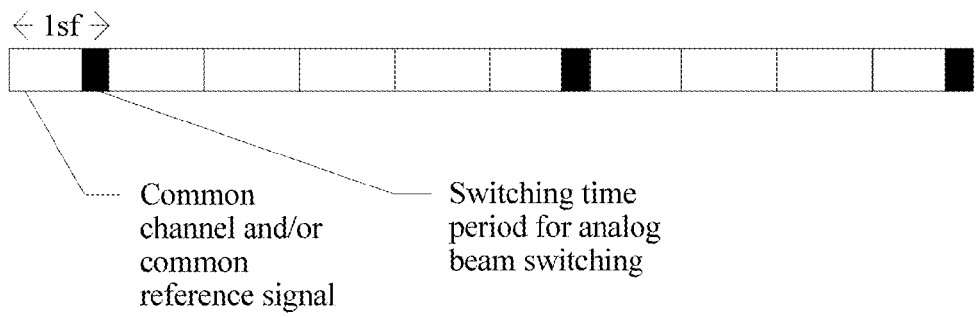
FIG. 2-e

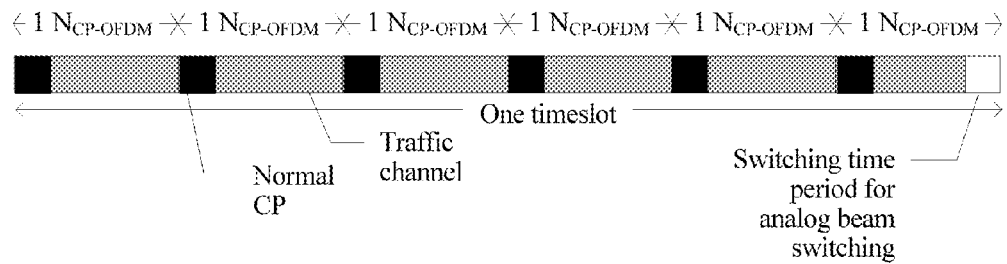
FIG. 2-f
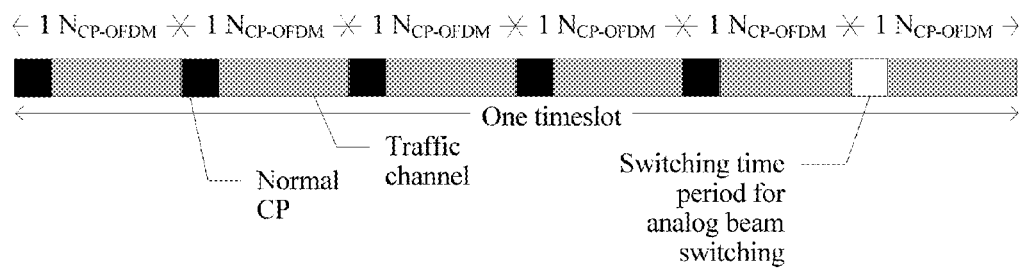
FIG. 2-g
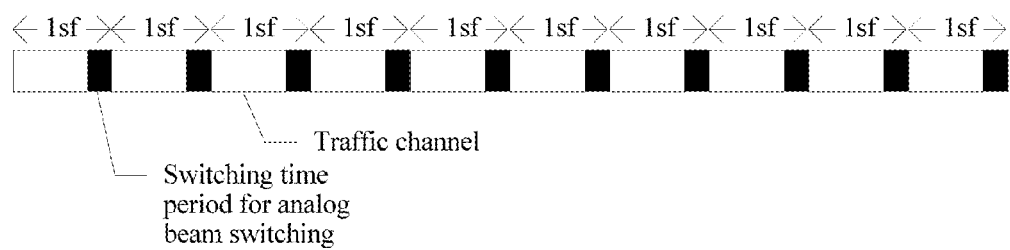
FIG. 2-h

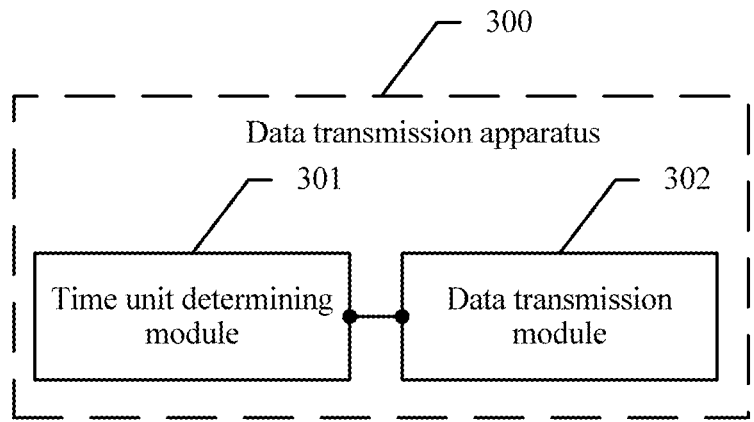
FIG. 3-a
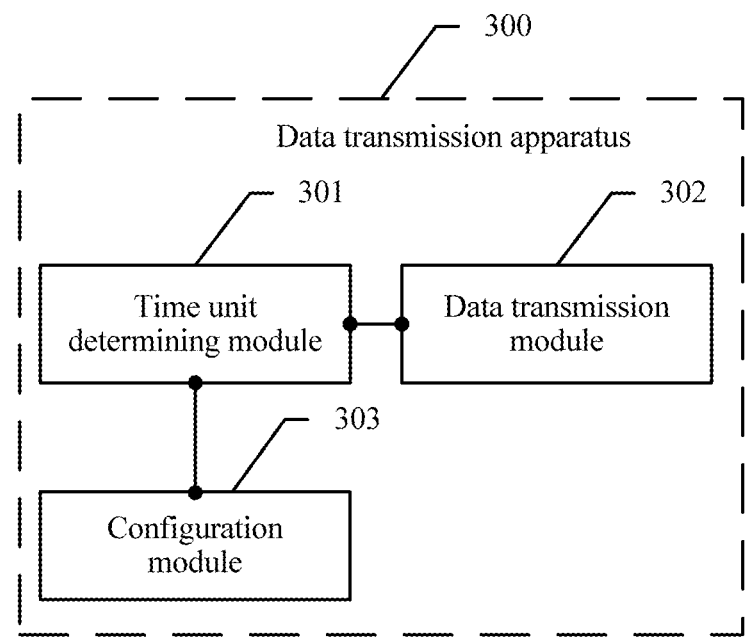
FIG. 3-b

DATA TRANSMISSION METHOD, APPARATUS AND SYSTEM, AND USER EQUIPMENT

CROSS-REFERENCE TO RELATED APPLICATIONS

This application is a continuation of International Application No. PCT/CN2015/073388, filed on Feb. 28, 2015, the disclosure of which is hereby incorporated by reference in its entirety.

TECHNICAL FIELD

Embodiments of the present invention relate to the communications field, and in particular, to a data transmission method, apparatus, and system, and user equipment.

BACKGROUND

A spectrum is an extremely expensive resource in wireless communications. Modern communications systems such as a Global System for Mobile Communications (GSM) system, a Wideband Code Division Multiple Access (WCDMA) system, and a Long Term Evolution (LTE) system usually work on a carrier lower than 3 gigahertz (GHz). As a smart terminal especially a video service appears, a current spectrum resource cannot meet explosive-growing user requirements for a capacity. A high frequency band (especially a millimeter-wave band) that has higher available bandwidth gradually becomes a candidate band for a next-generation communications system. For example, in a range of 3 GHz to 200 GHz, potential available bandwidth is approximately 250 GHz.

In the modern communications system, a multiple-antenna technology is usually used to increase a capacity and coverage of the system, or improve user experience. Another advantage of using the high frequency band is that a size in a multiple-antenna configuration can be greatly reduced, so as to facilitate site obtaining and deployment of more antennas. However, being different from an operating band in a current LTE system, the high frequency band results in a larger path loss. Particularly, factors such as atmosphere and vegetation further increase a wireless propagation loss. In this case, reliability of sending a synchronization channel, a control channel, a broadcast message, and the like in the current LTE system is affected. To resolve a coverage problem in the high frequency carrier scenario particularly the millimeter-wave scenario, an implementation method is as follows: Data is transmitted after virtual weighting is performed on multiple antenna elements in an analog domain to obtain one antenna port, so that a beamforming (BF) array gain can be obtained for data to be transmitted at each port. Therefore, a path loss in a high frequency scenario is overcome. However, because a beam formed in an array for a to-be-transmitted signal is relatively narrow, only some users in a cell can be covered. Further, analog domain-based BF and corresponding data transmission are performed in a time division manner, so as to ensure coverage for all users in the entire cell.

In the analog domain-based BF, one radio frequency (RF) chain is corresponding to virtual weighting of a group of multiple antenna elements (that is, corresponding to one analog beam), and different virtual weighting is corresponding to different RF chains. When different virtual weighting is used at different transmission moments, a switchover from one analog beam to another analog beam needs to be performed. Therefore, a switching time period for analog beam switching needs to be considered in a system frame structure design. In the prior art, a manner of configuring a switching time period for analog beam switching exists in orthogonal frequency division multiplexing (OFDM): A normal cyclic prefix (CP) in each to-be-sent modulation symbol is replaced with an empty CP, a time period of the empty CP is used as the switching time period, and a base station completes a switchover from one analog beam to another analog beam in the time period of the empty CP. Therefore, an extra guard time does not need to be reserved any longer. However, in the prior art, a switching time period is configured in each modulation symbol in a radio frame. In addition, for data carried in a to-be-sent modulation symbol, there is no need to perform analog beam switching quite frequently. Configuring an overlarge quantity of switching time periods causes great resource waste.

SUMMARY

Embodiments of the present invention provide a data transmission method, apparatus, and system, and user equipment, so as to reduce a switching time period that is for analog beam switching and is configured in a radio time window, and avoid resource waste.

According to a first aspect, an embodiment of the present invention provides a data transmission apparatus, including: a time unit determining module, configured to determine configuration information of a first time unit in a radio time window, where the first time unit includes multiple sub-time units, a switching time period and a transmission time period are reserved in a first sub-time unit at an interval of at least N sub-time units in the first time unit, the switching time period is used to perform analog beam switching for a common channel and/or a common reference signal, and N is a natural number; and a data transmission module, configured to transmit the common channel and/or the common reference signal in the first sub-time unit in the first time unit according to the configuration information of the first time unit, where the common channel and/or the common reference signal are/is transmitted in the transmission time period.

With reference to the first aspect, in a first possible implementation of the first aspect, N is a quantity of sub-time units in the first time unit that are occupied by the common channel and/or the common reference signal in each time of transmission in the first time unit.

With reference to the first aspect, in a second possible implementation of the first aspect, the first sub-time unit includes the switching time period and the transmission time period; or the first sub-time unit includes the switching time period, the transmission time period, and a cyclic prefix time period.

With reference to the second possible implementation of the first aspect, in a third possible implementation of the first aspect, the switching time period in the first sub-time unit is obtained by replacing a cyclic prefix (CP) of the common channel and/or the common reference signal; or the cyclic prefix time period is used to transmit a CP of the common channel and/or the common reference signal.

With reference to the first aspect, or the first, the second, or the third possible implementation of the first aspect, in a fourth possible implementation of the first aspect, the configuration information of the first time unit includes a time configuration number of the first time unit, and the time configuration number is a configuration that is determined according to a configuration period and that is of the first time unit occupied in transmission of the common channel and/or the common reference signal.

With reference to the first aspect, or the first, the second, the third, or the fourth possible implementation of the first aspect, in a fifth possible implementation of the first aspect, the data transmission module is further configured to: dynamically notify the configuration information of the first time unit to user equipment by using downlink control signaling, or notify the configuration information of the first time unit to user equipment by using higher layer signaling.

With reference to the first aspect, or the first, the second, the third, the fourth, or the fifth possible implementation of the first aspect, in a sixth possible implementation of the first aspect, the time unit determining module is further configured to determine configuration information of a second time unit in the radio time window, where the second time unit includes multiple sub-time units, the last M sub-time units are reserved in the second time unit to form a switching time period, the switching time period in the second time unit is used to perform analog beam switching for a traffic channel, and M is a natural number; and the data transmission module is further configured to transmit the traffic channel in the second time unit according to the configuration information of the second time unit, where the traffic channel is transmitted in a sub-time unit other than the last M sub-time units in the second time unit.

With reference to the first aspect, or the first, the second, the third, the fourth, or the fifth possible implementation of the first aspect, in a seventh possible implementation of the first aspect, the time unit determining module is further configured to determine configuration information of a second time unit in the radio time window, where the second time unit includes multiple sub-time units, a switching time period and a transmission time period are reserved in the last sub-time unit in the second time unit, and the switching time period in the second time unit is used to perform analog beam switching for a traffic channel; and the data transmission module is further configured to transmit the traffic channel in the second time unit according to the configuration information of the second time unit, where the traffic channel is transmitted in a sub-time unit other than the last sub-time unit in the second time unit and in the transmission time period in the last sub-time unit.

With reference to the seventh possible implementation of the first aspect, in an eighth possible implementation of the first aspect, a time period length of the transmission time period in the last sub-time unit in the second time unit is less than or equal to a length of a time period that is used to transmit the traffic channel and that is in the sub-time unit other than the last sub-time unit in the second time unit.

With reference to the first aspect, or the first, the second, the third, the fourth, the fifth, the sixth, the seventh, or the eighth possible implementation of the first aspect, in a ninth possible implementation of the first aspect, the data transmission apparatus further includes a configuration module, configured to configure, for the user equipment, a process for performing, in each sub-time unit in the first time unit, channel state information measurement on a pilot resource.

With reference to the first aspect, or the first, the second, the third, the fourth, the fifth, the sixth, the seventh, the eighth, or the ninth possible implementation of the first aspect, in a tenth possible implementation of the first aspect, a quantity of sub-time units included in the second time unit is greater than or equal to a quantity of sub-time units included in the first time unit.

According to a second aspect, an embodiment of the present invention further provides a data transmission apparatus, including: a time unit determining module, configured to determine configuration information of a second time unit in a radio time window, where the second time unit includes multiple sub-time units, the last M sub-time units are reserved in the second time unit to form a switching time period, the switching time period is used to perform analog beam switching for a traffic channel, and M is a natural number; and a data transmission module, configured to transmit the traffic channel in the second time unit according to the configuration information of the second time unit, where the traffic channel is transmitted in a sub-time unit other than the last M sub-time units in the second time unit.

With reference to the second aspect, in a first possible implementation of the second aspect, the configuration information of the second time unit includes a time configuration number of the second time unit, and the time configuration number is a configuration that is determined according to a configuration period and that is of the second time unit.

With reference to the second aspect, or the first possible implementation of the second aspect, in a second possible implementation of the second aspect, the data transmission module is further configured to: dynamically notify the configuration information of the second time unit to user equipment by using downlink control signaling, or notify the configuration information of the second time unit to user equipment by using higher layer signaling.

With reference to the second aspect, or the first or the second possible implementation of the second aspect, in a third possible implementation of the second aspect, the time unit determining module is further configured to determine configuration information of a first time unit in the radio time window, where the first time unit includes multiple sub-time units, a switching time period and a transmission time period are reserved in a first sub-time unit at an interval of at least N sub-time units in the first time unit, the switching time period in the first sub-time unit is used to perform analog beam switching for a common channel and/or a common reference signal, and N is a natural number; and the data transmission module is further configured to transmit the common channel and/or the common reference signal in the first sub-time unit in the first time unit according to the configuration information of the first time unit, where the common channel and/or the common reference signal are/is transmitted in the transmission time period in the first sub-time unit.

With reference to the second aspect, or the first, the second, or the third possible implementation of the second aspect, in a fourth possible implementation of the second aspect, the data transmission apparatus further includes: a configuration module, configured to configure, for the user equipment, a process for performing, in each sub-time unit in the first time unit, channel state information measurement on a pilot resource.

With reference to the second aspect, or the first, the second, the third, or the fourth possible implementation of the second aspect, in a fifth possible implementation of the second aspect, a quantity of sub-time units included in the second time unit is greater than or equal to a quantity of sub-time units included in the first time unit.

According to a third aspect, an embodiment of the present invention provides a data transmission apparatus, including: a time unit determining module, configured to determine configuration information of a second time unit in a radio time window, where the second time unit includes multiple sub-time units, a switching time period and a transmission time period are reserved in the last sub-time unit in the second time unit, and the switching time period is used to perform analog beam switching for a traffic channel; and a data transmission module, configured to transmit the traffic channel in the second time unit according to the configuration information of the second time unit, where the traffic channel is transmitted in a sub-time unit other than the last sub-time unit in the second time unit and in the transmission time period in the last sub-time unit.

With reference to the third aspect, in a first possible implementation of the third aspect, the configuration information of the second time unit includes a time configuration number of the second time unit, and the time configuration number is a configuration that is determined according to a configuration period and that is of the second time unit.

With reference to the third aspect, or the first possible implementation of the third aspect, in a second possible implementation of the third aspect, the data transmission module is further configured to: dynamically notify the configuration information of the second time unit to user equipment by using downlink control signaling, or notify the configuration information of the second time unit to user equipment by using higher layer signaling.

With reference to the third aspect, or the first or the second possible implementation of the third aspect, in a third possible implementation of the third aspect, the time unit determining module is further configured to determine configuration information of a first time unit in the radio time window, where the first time unit includes multiple sub-time units, a switching time period and a transmission time period are reserved in a first sub-time unit at an interval of at least N sub-time units in the first time unit, the switching time period in the first sub-time unit is used to perform analog beam switching for a common channel and/or a common reference signal, and N is a natural number; and the data transmission module is further configured to transmit the common channel and/or the common reference signal in the first sub-time unit in the first time unit according to the configuration information of the first time unit, where the common channel and/or the common reference signal are/is transmitted in the transmission time period in the first sub-time unit.

According to a fourth aspect, an embodiment of the present invention provides a data transmission apparatus, including: a time unit determining module, configured to determine configuration information of a third time unit in a radio time window, where the third time unit includes multiple sub-time units, the last M sub-time units are reserved in the third time unit to form a switching time period, the switching time period is used to perform analog beam switching for a common channel, or a common reference signal, or a traffic channel, and M is a natural number; and a data transmission module, configured to transmit the common channel, or the common reference signal, or the traffic channel in the third time unit according to the configuration information of the third time unit, where the common channel, or the common reference signal, or the traffic channel is transmitted in a sub-time unit other than the last M sub-time units in the third time unit.

With reference to the fourth aspect, in a first possible implementation of the fourth aspect, the configuration information of the third time unit includes a time configuration number of the third time unit, and the time configuration number is a configuration that is determined according to a configuration period and that is of the third time unit occupied in transmission of the common channel, or the common reference signal, or the traffic channel.

With reference to the fourth aspect, or the first possible implementation of the fourth aspect, in a second possible implementation of the fourth aspect, the data transmission module is further configured to: dynamically notify the configuration information of the third time unit to user equipment by using downlink control signaling, or notify the configuration information of the third time unit to user equipment by using higher layer signaling.

According to a fifth aspect, an embodiment of the present invention provides user equipment, including: a configuration obtaining module, configured to obtain configuration information of a first time unit in a radio time window, where the first time unit includes multiple sub-time units, a switching time period and a transmission time period are reserved in a first sub-time unit at an interval of at least N sub-time units in the first time unit, the switching time period is used to perform analog beam switching for a common channel and/or a common reference signal, and N is a natural number; and a receiving module, configured to receive the common channel and/or the common reference signal in the transmission time period.

With reference to the fifth aspect, in a first possible implementation of the fifth aspect, the configuration obtaining module is further configured to obtain configuration information of a second time unit in the radio time window, where the second time unit includes multiple sub-time units, the last M sub-time units are reserved in the second time unit to form a switching time period, the switching time period in the second time unit is used to perform analog beam switching for a traffic channel, and M is a natural number; and the receiving module is further configured to receive the traffic channel in a sub-time unit other than the last M sub-time units in the second time unit.

With reference to the fifth aspect, in a second possible implementation of the fifth aspect, the configuration obtaining module is further configured to obtain configuration information of a second time unit in the radio time window, where the second time unit includes multiple sub-time units, a switching time period and a transmission time period are reserved in the last sub-time unit in the second time unit, and the switching time period in the second time unit is used to perform analog beam switching for a traffic channel; and the receiving module is further configured to receive the traffic channel in a sub-time unit other than the last sub-time unit in the second time unit and in the transmission time period in the last sub-time unit.

With reference to the fifth aspect, or the first or the second possible implementation of the fifth aspect, in a third possible implementation of the fifth aspect, the configuration obtaining module is specifically configured to: receive the configuration information that is of the first time unit in the radio time window and is notified by using downlink control signaling or higher layer signaling; and receive the configuration information that is of the second time unit in the radio time window and is notified by using downlink control signaling or higher layer signaling.

According to a sixth aspect, an embodiment of the present invention provides user equipment, including: a configuration obtaining module, configured to obtain configuration information of a second time unit in a radio time window, where the second time unit includes multiple sub-time units, the last M sub-time units are reserved in the second time unit to form a switching time period, the switching time period is used to perform analog beam switching for a traffic channel, and M is a natural number; and a receiving module, configured to receive the traffic channel in a sub-time unit other than the last M sub-time units in the second time unit.

With reference to the sixth aspect, in a first possible implementation of the sixth aspect, the configuration obtaining module is further configured to obtain configuration information of a first time unit in the radio time window, where the first time unit includes multiple sub-time units, a switching time period and a transmission time period are reserved in a first sub-time unit at an interval of at least N sub-time units in the first time unit, the switching time period in the first sub-time unit is used to perform analog beam switching for a common channel and/or a common reference signal, and N is a natural number; and the receiving module is further configured to receive the common channel and/or the common reference signal in the transmission time period in the first sub-time unit.

With reference to the sixth aspect, or the first possible implementation of the sixth aspect, in a second possible implementation of the sixth aspect, the configuration obtaining module is further configured to: receive the configuration information that is of the second time unit in the radio time window and is notified by using downlink control signaling or higher layer signaling; and receive the configuration information that is of the first time unit in the radio time window and is notified by using downlink control signaling or higher layer signaling.

According to a seventh aspect, an embodiment of the present invention provides user equipment, including: a configuration obtaining module, configured to obtain configuration information of a second time unit in a radio time window, where the second time unit includes multiple sub-time units, a switching time period and a transmission time period are reserved in the last sub-time unit in the second time unit, and the switching time period is used to perform analog beam switching for a traffic channel; and a receiving module, configured to receive the traffic channel in a sub-time unit other than the last sub-time unit in the second time unit and in the transmission time period in the last sub-time unit.

With reference to the seventh aspect, in a first possible implementation of the seventh aspect, the configuration obtaining module is further configured to obtain configuration information of a first time unit in the radio time window, where the first time unit includes multiple sub-time units, a switching time period and a transmission time period are reserved in a first sub-time unit at an interval of at least N sub-time units in the first time unit, the switching time period in the first sub-time unit is used to perform analog beam switching for a common channel and/or a common reference signal, and N is a natural number; and the receiving module is further configured to receive the common channel and/or the common reference signal in the transmission time period in the first sub-time unit.

With reference to the seventh aspect, or the first possible implementation of the seventh aspect, in a second possible implementation of the seventh aspect, the configuration obtaining module is specifically configured to: receive the configuration information that is of the second time unit in the radio time window and is notified by using downlink control signaling or higher layer signaling; and receive the configuration information that is of the first time unit in the radio time window and is notified by using downlink control signaling or higher layer signaling.

According to an eighth aspect, an embodiment of the present invention provides user equipment, including: a configuration obtaining module, configured to obtain configuration information of a third time unit in a radio time window, where the third time unit includes multiple sub-time units, the last M sub-time units are reserved in the third time unit to form a switching time period, the switching time period is used to perform analog beam switching for a common channel, or a common reference signal, or a traffic channel, and M is a natural number; and a receiving module, configured to receive the common channel, or the common reference signal, or the traffic channel in a sub-time unit other than the last M sub-time units in the third time unit.

With reference to the eighth aspect, in a first possible implementation of the eighth aspect, the configuration obtaining module is specifically configured to receive the configuration information that is of the third time unit in the radio time window and is notified by using downlink control signaling or higher layer signaling.

According to a ninth aspect, an embodiment of the present invention provides a data transmission system, including: the data transmission apparatus according to any one of the possible implementations of the first aspect and the user equipment according to any one of the possible implementations of the fifth aspect; or the data transmission apparatus according to any one of the possible implementations of the second aspect and the user equipment according to any one of the possible implementations of the sixth aspect; or the data transmission apparatus according to any one of the possible implementations of the third aspect and the user equipment according to any one of the possible implementations of the seventh aspect; or the data transmission apparatus according to any one of the possible implementations of the fourth aspect and the user equipment according to any one of the possible implementations of the eighth aspect.

According to a tenth aspect, an embodiment of the present invention provides a data transmission method, including: determining configuration information of a first time unit in a radio time window, where the first time unit includes multiple sub-time units, a switching time period and a transmission time period are reserved in a first sub-time unit at an interval of at least N sub-time units in the first time unit, the switching time period is used to perform analog beam switching for a common channel and/or a common reference signal, and N is a natural number; and transmitting the common channel and/or the common reference signal in the first sub-time unit in the first time unit according to the configuration information of the first time unit, where the common channel and/or the common reference signal are/is transmitted in the transmission time period.

With reference to the tenth aspect, in a first possible implementation of the tenth aspect, N is a quantity of sub-time units in the first time unit that are occupied by the common channel and/or the common reference signal in each time of transmission in the first time unit.

With reference to the tenth aspect, in a second possible implementation of the tenth aspect, the first sub-time unit includes the switching time period and the transmission time period; or the first sub-time unit includes the switching time period, the transmission time period, and a cyclic prefix time period.

With reference to the second possible implementation of the tenth aspect, in a third possible implementation of the tenth aspect, the switching time period in the first sub-time unit is obtained by replacing a CP of the common channel and/or the common reference signal; or the cyclic prefix time period is used to transmit a CP of the common channel and/or the common reference signal.

With reference to the tenth aspect, or the first or the second possible implementation of the tenth aspect, in a fourth possible implementation of the tenth aspect, the switching time period is determined according to a predefined switching time configuration index.

With reference to the tenth aspect, or the first, the second, the third, or the fourth possible implementation of the tenth aspect, in a fifth possible implementation of the tenth aspect, the configuration information of the first time unit includes a time configuration number of the first time unit, and the time configuration number is a configuration that is determined according to a configuration period and that is of the first time unit occupied in transmission of the common channel and/or the common reference signal.

With reference to the tenth aspect, or the first, the second, the third, the fourth, or the fifth possible implementation of the tenth aspect, in a sixth possible implementation of the tenth aspect, the configuration information of the first time unit is dynamically notified to user equipment by using downlink control signaling, or is notified to user equipment by using higher layer signaling.

With reference to the tenth aspect, or the first, the second, the third, the fourth, the fifth, or the sixth possible implementation of the tenth aspect, in a seventh possible implementation of the tenth aspect, the method further includes: determining configuration information of a second time unit in the radio time window, where the second time unit includes multiple sub-time units, the last M sub-time units are reserved in the second time unit to form a switching time period, the switching time period in the second time unit is used to perform analog beam switching for a traffic channel, and M is a natural number; and transmitting the traffic channel in the second time unit according to the configuration information of the second time unit, where the traffic channel is transmitted in a sub-time unit other than the last M sub-time units in the second time unit.

With reference to the tenth aspect, or the first, the second, the third, the fourth, the fifth, or the sixth possible implementation of the tenth aspect, in an eighth possible implementation of the tenth aspect, the method further includes: determining configuration information of a second time unit in the radio time window, where the second time unit includes multiple sub-time units, a switching time period and a transmission time period are reserved in the last sub-time unit in the second time unit, and the switching time period in the second time unit is used to perform analog beam switching for a traffic channel; and transmitting the traffic channel in the second time unit according to the configuration information of the second time unit, where the traffic channel is transmitted in a sub-time unit other than the last sub-time unit in the second time unit and in the transmission time period in the last sub-time unit.

With reference to the eighth possible implementation of the tenth aspect, in a ninth possible implementation of the tenth aspect, a time period length of the transmission time period in the last sub-time unit in the second time unit is less than or equal to a length of a time period that is used to transmit the traffic channel and that is in the sub-time unit other than the last sub-time unit in the second time unit.

With reference to the tenth aspect, or the first, the second, the third, the fourth, the fifth, the sixth, the seventh, the eighth, or the ninth possible implementation of the tenth aspect, in a tenth possible implementation of the tenth aspect, the method further includes: configuring, for the user equipment, a process for performing, in each sub-time unit in the first time unit, channel state information measurement on a pilot resource.

With reference to the tenth possible implementation of the tenth aspect, in an eleventh possible implementation of the tenth aspect, a pilot resource measured in each sub-time unit is corresponding to a piece of pre-coding information.

With reference to the tenth aspect, or the first, the second, the third, the fourth, the fifth, the sixth, the seventh, the eighth, the ninth, the tenth, or the eleventh possible implementation of the tenth aspect, in a twelfth possible implementation of the tenth aspect, a quantity of sub-time units included in the second time unit is greater than or equal to a quantity of sub-time units included in the first time unit.

According to an eleventh aspect, an embodiment of the present invention further provides a data transmission method, including: determining configuration information of a second time unit in a radio time window, where the second time unit includes multiple sub-time units, the last M sub-time units are reserved in the second time unit to form a switching time period, the switching time period is used to perform analog beam switching for a traffic channel, and M is a natural number; and transmitting the traffic channel in the second time unit according to the configuration information of the second time unit, where the traffic channel is transmitted in a sub-time unit other than the last M sub-time units in the second time unit.

With reference to the eleventh aspect, in a first possible implementation of the eleventh aspect, a time length of the switching time period is determined according to a predefined switching time configuration index.

With reference to the eleventh aspect, or the first possible implementation of the eleventh aspect, in a second possible implementation of the eleventh aspect, the configuration information of the second time unit includes a time configuration number of the second time unit, and the time configuration number is a configuration that is determined according to a configuration period and that is of the second time unit.

With reference to the eleventh aspect, or the first or the second possible implementation of the eleventh aspect, in a third possible implementation of the eleventh aspect, the configuration information of the second time unit is dynamically notified to user equipment by using downlink control signaling, or is notified to user equipment by using higher layer signaling.

With reference to the eleventh aspect, or the first, the second, or the third possible implementation of the eleventh aspect, in a fourth possible implementation of the eleventh aspect, the method further includes: determining configuration information of a first time unit in the radio time window, where the first time unit includes multiple sub-time units, a switching time period and a transmission time period are reserved in a first sub-time unit at an interval of at least N sub-time units in the first time unit, the switching time period in the first sub-time unit is used to perform analog beam switching for a common channel and/or a common reference signal, and N is a natural number; and transmitting the common channel and/or the common reference signal in the first sub-time unit in the first time unit according to the configuration information of the first time unit, where the common channel and/or the common reference signal are/is transmitted in the transmission time period in the first sub-time unit.

With reference to the fourth possible implementation of the eleventh aspect, in a fifth possible implementation of the eleventh aspect, the method further includes: configuring, for the user equipment, a process for performing, in each sub-time unit in the first time unit, channel state information measurement on a pilot resource.

With reference to the eleventh aspect, or the first, the second, the third, the fourth, or the fifth possible implementation of the eleventh aspect, in a sixth possible implementation of the eleventh aspect, a quantity of sub-time units included in the second time unit is greater than or equal to a quantity of sub-time units included in the first time unit.

According to a twelfth aspect, an embodiment of the present invention provides a data transmission method, including: determining configuration information of a second time unit in a radio time window, where the second time unit includes multiple sub-time units, a switching time period and a transmission time period are reserved in the last sub-time unit in the second time unit, and the switching time period is used to perform analog beam switching for a traffic channel; and transmitting the traffic channel in the second time unit according to the configuration information of the second time unit, where the traffic channel is transmitted in a sub-time unit other than the last sub-time unit in the second time unit and in the transmission time period in the last sub-time unit.

With reference to the twelfth aspect, in a first possible implementation of the twelfth aspect, a time length of the switching time period is determined according to a predefined switching time configuration index.

With reference to the twelfth aspect, or the first possible implementation of the twelfth aspect, in a second possible implementation of the twelfth aspect, the configuration information of the second time unit includes a time configuration number of the second time unit, and the time configuration number is a configuration that is determined according to a configuration period and that is of the second time unit.

With reference to the twelfth aspect, or the first or the second possible implementation of the twelfth aspect, in a third possible implementation of the twelfth aspect, the configuration information of the second time unit is dynamically notified to user equipment by using downlink control signaling, or is notified to user equipment by using higher layer signaling.

With reference to the twelfth aspect, or the first, the second, or the third possible implementation of the twelfth aspect, in a fourth possible implementation of the twelfth aspect, the method further includes: determining configuration information of a first time unit in the radio time window, where the first time unit includes multiple sub-time units, a switching time period and a transmission time period are reserved in a first sub-time unit at an interval of at least N sub-time units in the first time unit, the switching time period in the first sub-time unit is used to perform analog beam switching for a common channel and/or a common reference signal, and N is a natural number; and transmitting the common channel and/or the common reference signal in the first sub-time unit in the first time unit according to the configuration information of the first time unit, where the common channel and/or the common reference signal are/is transmitted in the transmission time period in the first sub-time unit.

With reference to the twelfth aspect, or the first, the second, the third, or the fourth possible implementation of the twelfth aspect, in a fifth possible implementation of the twelfth aspect, a quantity of sub-time units included in the second time unit is greater than or equal to a quantity of sub-time units included in the first time unit.

According to a thirteenth aspect, an embodiment of the present invention provides a data transmission method, including: determining configuration information of a third time unit in a radio time window, where the third time unit includes multiple sub-time units, the last M sub-time units are reserved in the third time unit to form a switching time period, the switching time period is used to perform analog beam switching for a common channel, or a common reference signal, or a traffic channel, and M is a natural number; and transmitting the common channel, or the common reference signal, or the traffic channel in the third time unit according to the configuration information of the third time unit, where the common channel, or the common reference signal, or the traffic channel is transmitted in a sub-time unit other than the last M sub-time units in the third time unit.

With reference to the thirteenth aspect, in a first possible implementation of the thirteenth aspect, a time length of the switching time period is determined according to a predefined switching time configuration index.

With reference to the thirteenth aspect, or the first possible implementation of the thirteenth aspect, in a second possible implementation of the thirteenth aspect, the configuration information of the third time unit includes a time configuration number of the third time unit, and the time configuration number is a configuration that is determined according to a configuration period and that is of the third time unit occupied in transmission of the common channel, or the common reference signal, or the traffic channel.

With reference to the thirteenth aspect, or the first or the second possible implementation of the thirteenth aspect, in a third possible implementation of the thirteenth aspect, the configuration information of the third time unit is dynamically notified to user equipment by using downlink control signaling, or is notified to user equipment by using higher layer signaling.

According to a fourteenth aspect, an embodiment of the present invention provides a data transmission method, including: obtaining configuration information of a first time unit in a radio time window, where the first time unit includes multiple sub-time units, a switching time period and a transmission time period are reserved in a first sub-time unit at an interval of at least N sub-time units in the first time unit, the switching time period is used to perform analog beam switching for a common channel and/or a common reference signal, and N is a natural number; and receiving the common channel and/or the common reference signal in the transmission time period.

With reference to the fourteenth aspect, in a first possible implementation of the fourteenth aspect, the method further includes: obtaining configuration information of a second time unit in the radio time window, where the second time unit includes multiple sub-time units, the last M sub-time units are reserved in the second time unit to form a switching time period, the switching time period in the second time unit is used to perform analog beam switching for a traffic channel, and M is a natural number; and receiving the traffic channel in a sub-time unit other than the last M sub-time units in the second time unit.

With reference to the fourteenth aspect, in a second possible implementation of the fourteenth aspect, the method further includes: obtaining configuration information of a second time unit in the radio time window, where the second time unit includes multiple sub-time units, a switching time period and a transmission time period are reserved in the last sub-time unit in the second time unit, and the switching time period in the second time unit is used to perform analog beam switching for a traffic channel; and receiving the traffic channel in a sub-time unit other than the last sub-time unit in the second time unit and in the transmission time period in the last sub-time unit.

With reference to the fourteenth aspect, or the first or the second possible implementation of the fourteenth aspect, in a third possible implementation of the fourteenth aspect, the obtaining configuration information of a first time unit in a radio time window includes: receiving the configuration information that is of the first time unit in the radio time window and is notified by using downlink control signaling or higher layer signaling; and the obtaining configuration information of a second time unit in the radio time window includes: receiving the configuration information that is of the second time unit in the radio time window and is notified by using downlink control signaling or higher layer signaling.

According to a fifteenth aspect, an embodiment of the present invention provides a data transmission method, including: obtaining configuration information of a second time unit in a radio time window, where the second time unit includes multiple sub-time units, the last M sub-time units are reserved in the second time unit to form a switching time period, the switching time period is used to perform analog beam switching for a traffic channel, and M is a natural number; and receiving the traffic channel in a sub-time unit other than the last M sub-time units in the second time unit.

With reference to the fifteenth aspect, in a first possible implementation of the fifteenth aspect, the method further includes: obtaining configuration information of a first time unit in the radio time window, where the first time unit includes multiple sub-time units, a switching time period and a transmission time period are reserved in a first sub-time unit at an interval of at least N sub-time units in the first time unit, the switching time period in the first sub-time unit is used to perform analog beam switching for a common channel and/or a common reference signal, and N is a natural number; and receiving the common channel and/or the common reference signal in the transmission time period in the first sub-time unit.

With reference to the fifteenth aspect, or the first possible implementation of the fifteenth aspect, in a second possible implementation of the fifteenth aspect, the obtaining configuration information of a second time unit in a radio time window includes: receiving the configuration information that is of the second time unit in the radio time window and is notified by using downlink control signaling or higher layer signaling; and the obtaining configuration information of a first time unit in the radio time window includes: receiving the configuration information that is of the first time unit in the radio time window and is notified by using downlink control signaling or higher layer signaling.

According to a sixteenth aspect, an embodiment of the present invention provides a data transmission method, including: obtaining configuration information of a second time unit in a radio time window, where the second time unit includes multiple sub-time units, a switching time period and a transmission time period are reserved in the last sub-time unit in the second time unit, and the switching time period is used to perform analog beam switching for a traffic channel; and receiving the traffic channel in a sub-time unit other than the last sub-time unit in the second time unit and in the transmission time period in the last sub-time unit.

With reference to the sixteenth aspect, in a first possible implementation of the sixteenth aspect, the method further includes: obtaining configuration information of a first time unit in the radio time window, where the first time unit includes multiple sub-time units, a switching time period and a transmission time period are reserved in a first sub-time unit at an interval of at least N sub-time units in the first time unit, the switching time period in the first sub-time unit is used to perform analog beam switching for a common channel and/or a common reference signal, and N is a natural number; and receiving the common channel and/or the common reference signal in the transmission time period in the first sub-time unit.

With reference to the sixteenth aspect, or the first possible implementation of the sixteenth aspect, in a second possible implementation of the sixteenth aspect, the obtaining configuration information of a second time unit in a radio time window includes: receiving the configuration information that is of the second time unit in the radio time window and is notified by using downlink control signaling or higher layer signaling; and the obtaining configuration information of a first time unit in the radio time window includes: receiving the configuration information that is of the first time unit in the radio time window and is notified by using downlink control signaling or higher layer signaling.

According to a seventeenth aspect, an embodiment of the present invention provides a data transmission method, including: obtaining configuration information of a third time unit in a radio time window, where the third time unit includes multiple sub-time units, the last M sub-time units are reserved in the third time unit to form a switching time period, the switching time period is used to perform analog beam switching for a common channel, or a common reference signal, or a traffic channel, and M is a natural number; and receiving the common channel, or the common reference signal, or the traffic channel in a sub-time unit other than the last M sub-time units in the third time unit.

With reference to the seventeenth aspect, in a first possible implementation of the seventeenth aspect, the obtaining configuration information of a third time unit in a radio time window includes: receiving the configuration information that is of the third time unit in the radio time window and is notified by using downlink control signaling or higher layer signaling.

It can be learned from the technical solutions that, the embodiments of the present invention have the following advantages.

In an embodiment of the present invention, first, configuration information of a first time unit in a radio time window is determined. The first time unit includes multiple sub-time units, a switching time period and a transmission time period are reserved in a first sub-time unit at an interval of at least N sub-time units in the first time unit, and the switching time period is used to perform analog beam switching for a common channel and/or a common reference signal. Next, the common channel and/or the common reference signal are/is transmitted in the first sub-time unit in the first time unit according to the configuration information of the first time unit, and the common channel and/or the common reference signal are/is transmitted in the transmission time period in the first sub-time unit. Because a switching time period in which analog beam switching can be performed is reserved in a first sub-time unit at an interval of at least N sub-time units in a first time unit in a radio time window, analog beam switching can be performed in the switching time period by adjusting virtual weighting of antenna elements. A common channel and/or a common reference channel are/is not transmitted in the switching time period but transmitted in a transmission time period in the first sub-time unit. Because the first sub-time unit to which a preset switching time period belongs is a sub-time unit at an interval of at least N sub-time units in the first time unit, there is no need to configure a switching time period in each sub-time unit in each time unit in the radio time window, so that resource waste can be avoided.

BRIEF DESCRIPTION OF THE DRAWINGS

FIG. 1-*a* is a schematic structural composition diagram of a data transmission apparatus according to an embodiment of the present invention;

FIG. 1-*b* is a schematic structural composition diagram of another data transmission apparatus according to an embodiment of the present invention;

FIG. 2-*a* is a schematic diagram of a frame structure of a first subframe according to an embodiment of the present invention;

FIG. 2-*b* is a schematic diagram of another frame structure of a first subframe according to an embodiment of the present invention;

FIG. 2-C is a schematic diagram of a frame structure of PBCH transmission in a first subframe according to an embodiment of the present invention;

FIG. 2-*d* is a schematic diagram of a frame structure of PSS/SSS transmission in a first subframe according to an embodiment of the present invention;

FIG. 2-*e* is a schematic diagram of a frame structure of a radio frame according to an embodiment of the present invention;

FIG. 2-*f* is a schematic diagram of a frame structure of a second subframe according to an embodiment of the present invention;

FIG. 2-*g* is a schematic diagram of another frame structure of a second subframe according to an embodiment of the present invention;

FIG. 2-*h* is a schematic diagram of another frame structure of a second subframe according to an embodiment of the present invention;

FIG. 3-*a* is a schematic structural composition diagram of another data transmission apparatus according to an embodiment of the present invention;

FIG. 3-*b* is a schematic structural composition diagram of another data transmission apparatus according to an embodiment of the present invention;

DETAILED DESCRIPTION OF ILLUSTRATIVE EMBODIMENTS

Figure 4:
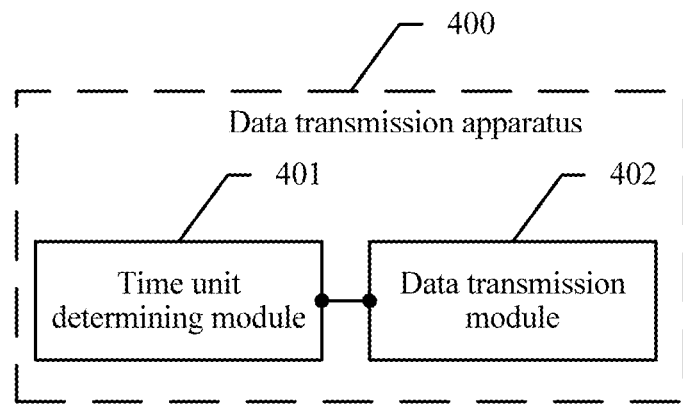
FIG. 4 is a schematic structural composition diagram of another data transmission apparatus according to an embodiment of the present invention.

Embodiments of the present invention provide a data transmission method, apparatus, and system, and user equipment, so as to reduce a switching time period that is for analog beam switching and is configured in a radio time window, and avoid resource waste.

To make the embodiment objectives, features, and advantages of the present embodiments clearer and more comprehensible, the following clearly describes the technical solutions in the embodiments of the present invention with reference to the accompanying drawings in the embodiments of the present invention. Apparently, the embodiments described in the following are only some but not all of the embodiments of the present invention. All other embodiments obtained by persons skilled in the art based on the embodiments of the present invention shall fall within the protection scope of the present embodiments.

In the specification, claims, and accompanying drawings of the present invention, terms such as "first" and "second" are intended to distinguish between similar objects but do not necessarily indicate a specific order or sequence. It should be understood that, the terms used in such a way are interchangeable in proper circumstances. This is only a discrimination manner that is used when objects having a same attribute are described in the embodiments of the present invention. In addition, terms such as "include" and "have" and any other variants of them mean to cover a non-exclusive inclusion, so that a process, a method, a system, a product, or a device that includes a list of units is not necessarily limited to those units, but may include other units that are not expressly listed or are inherent to the process, the method, the system, the product, or the device.

Details are separately described in the following.

Referring to FIG. 1-*a*, a data transmission apparatus 100 provided in an embodiment of the present invention may include a time unit determining module 101 and a data transmission module 102.

The time unit determining module 101 is configured to determine configuration information of a first time unit in a radio time window, where the first time unit includes multiple sub-time units, a switching time period and a transmission time period are reserved in a first sub-time unit at an interval of at least N sub-time units in the first time unit, the switching time period is used to perform analog beam switching for a common channel and/or a common reference signal, and N is a natural number.

The data transmission module 102 is configured to transmit the common channel and/or the common reference signal in the first sub-time unit in the first time unit according to the configuration information of the first time unit, where the common channel and/or the common reference signal are/is transmitted in the transmission time period.

In some embodiments of the present invention, N is a quantity of sub-time units in the first time unit that are occupied by the common channel and/or the common reference signal in each time of transmission in the first time unit.

In some embodiments of the present invention, the first sub-time unit includes the switching time period and the transmission time period; or the first sub-time unit includes the switching time period, the transmission time period, and a cyclic prefix time period.

Further, the switching time period in the first sub-time unit is obtained by replacing a cyclic prefix (CP) of the common channel and/or the common reference signal; or the cyclic prefix time period is used to transmit a CP of the common channel and/or the common reference signal.

In some embodiments of the present invention, the configuration information of the first time unit includes a time configuration number of the first time unit, and the time configuration number is a configuration that is determined according to a configuration period and that is of the first time unit occupied in transmission of the common channel and/or the common reference signal.

In some embodiments of the present invention, a quantity of sub-time units included in a second time unit is greater than or equal to a quantity of sub-time units included in the first time unit.

In this embodiment of the present invention, when data is transmitted by using a high frequency band, there is a relatively large wireless propagation loss. Therefore, data is transmitted after virtual weighting is performed on multiple antenna elements in an analog domain to obtain one antenna port, and a beamforming array gain may be obtained for data to be transmitted at each port. Therefore, a relatively large path loss in a high frequency scenario is overcome. However, because a beam formed in an array for a to-be-transmitted signal is relatively narrow, analog domain-based beamforming and corresponding data transmission need to be performed in a time division manner, so as to ensure coverage for all users in an entire cell.

In the analog domain-based beamforming, one radio frequency (RF) chain is corresponding to virtual weighting of a group of multiple antenna elements (that is, corresponding to one analog beam), and different virtual weighting is corresponding to different analog beams. When different virtual weighting is used at different transmission moments, a switchover from one analog beam to another analog beam needs to be performed. Therefore, how to configure the switching time period for analog beam switching needs to be considered in a system frame structure design.

In the prior art, a manner of configuring a switching time period for analog beam switching exists in orthogonal frequency division multiplexing (OFDM): a normal CP in each to-be-sent modulation symbol is replaced with an empty cyclic prefix (CP), a time period of the empty CP is used as the switching time period, and a base station completes a switchover from one analog beam to another analog beam in the time period of the empty CP. Therefore, an extra guard time does not need to be reserved any longer. However, in the prior art, a switching time period needs to be configured in each modulation symbol in a radio frame. In addition, for data carried in a to-be-sent modulation symbol, there is no need to perform analog beam switching quite frequently. Configuring an overlarge quantity of switching time periods causes great resource waste.

To resolve the problem existing in the prior art, the time unit determining module 101 in this embodiment of the present invention classifies transmitted data, and uses, for different types of data, a switching time period configuration manner suitable for transmitting the data. The radio time window is a time domain resource used in transmitting a wireless signal. For example, with reference to a specific application scenario, a radio time window may be a wireless transmission time unit in a broad sense, or may be a specific transmission time unit such as a hyper frame, a radio frame, a subframe, or a timeslot. Data transmitted in the radio time window may fall into two types: a common channel and/or a common reference signal, and a traffic channel. According to the two types of data obtained by means of classification, all time units in each radio time window that are used to transmit the data fall into two types: One type of time unit is defined as a first time unit, and the other type of time unit is defined as a second time unit. For example, if the radio time window is a radio frame, the first time unit may represent a first subframe in the radio frame, and the second time unit may represent a second subframe in the radio frame. Alternatively, if the radio time window is a hyper frame, the first time unit represents a first radio frame in the radio hyper frame, and the second time unit represents a second radio frame in the radio hyper frame. Alternatively, if the radio time window is a radio subframe, the first time unit represents a first symbol in the radio subframe, and the second time unit represents a second symbol in the radio subframe. The common channel and/or the common reference signal are/is transmitted in the first time unit in the radio time window, and the traffic channel is transmitted in the second time unit in the radio time window. That is, the first time unit is a time unit for transmitting the common channel and/or the common reference signal, and the second time unit is a time unit for transmitting the traffic channel. In one radio time window, there may be one or more first time units. Similarly, in one radio time window, there may be one or more second time units. In addition, the common channel and/or the common reference signal in this embodiment of the present invention may include a synchronization signal, a control channel, a broadcast channel, and the like, for example, a physical broadcast channel (PBCH), a physical hybrid automatic repeat request indicator channel (PHICH), a physical control format indicator channel (PCFICH), a primary synchronization signal/secondary synchronization signal (PSS/SSS), and a physical downlink control channel (PDCCH).

Because a relatively large path loss and large scale fading exist in a high frequency scenario, coverage of the traffic channel may be overcome by performing beamforming by using a large quantity of antenna ports at a transmit end. A beamforming technology is usually not used in transmission of the common channel and the common reference signal, so as to ensure wide coverage of an entire cell. Consequently, coverage is severely limited. To ensure cell-level coverage of the common channel and/or the common reference signal, the common channel and/or the common reference signal may be usually sent in a time division manner by using multiple analog beams. Each analog beam is corresponding to virtual weighting of a set of multiple antenna elements. In addition, in a practical system, a time granularity of transmitting data on the traffic channel is usually greater than a time granularity of transmitting data or a signal on the common channel and/or the common reference signal. For example, in a long term evolution (LTE) system, the time granularity of transmitting the data on the traffic channel is one radio subframe, and the time granularity of transmitting the data or the signal on the common channel and/or the common reference signal is one or several symbols in the radio subframe. Therefore, a time granularity of changing or switching an analog beam on which transmission of the data on the traffic channel is based is configured differently from a time granularity of changing or switching an analog beam corresponding to transmission of the data or the signal on the common channel and/or the common reference signal. For example, the analog beam on which transmission of the data on the traffic channel is based is switched at a subframe level, that is, a minimum time granularity of switching the analog beam on which transmission of the traffic channel is based is a subframe. The analog beam corresponding to transmission of the data or the signal on the common channel and/or the common reference signal is switched at a symbol level, that is, a minimum time granularity of switching the analog beam corresponding to transmission of the common channel and/or the common reference signal is a symbol.

Specifically, for the first time unit for transmitting the common channel and/or the common reference signal, a first sub-time unit is determined at an interval of N sub-time units in the first time unit, for example, when a value of N is 2, a first sub-time unit exists at an interval of two sub-time units in the first time unit. A switching time period and a transmission time period are reserved in the first sub-time unit. A time resource in the first sub-time unit is divided into two time periods. The two time periods have respective functions. It is specific that the switching time period is reserved to perform analog beam switching.

Further, a quantity of sub-time units in the first time unit that are occupied by the common channel and/or the common reference signal in each time of transmission in the first time unit may be determined first, for example, a quantity of symbols in the first subframe that are occupied by the common channel and/or the common reference signal in each time of transmission in the first subframe. The quantity of sub-time units is represented by N. The value of N is a natural number greater than or equal to 1. A time period is determined from the first sub-time unit at an interval of at least N sub-time units in the first time unit in the radio time window according to the quantity N of sub-time units occupied by the common channel and/or the common reference signal, and the determined time period is the switching time period. The determined time period (that is, the switching time period) is reserved to perform analog beam switching. That is, the first sub-time unit may be determined according to the quantity of sub-time units occupied by the common channel and/or the common reference signal that are/is transmitted in the first time unit, so as to determine the switching time period reserved in the first sub-time unit. For a specific implementation of the common channel and/or the common reference signal, the quantity N of sub-time units may also have a corresponding specific value. Description is given by using an example in a subsequent process. It should be noted that, in this embodiment of the present invention, because the switching time period for analog beam switching may be several tenths of a microsecond, or several microseconds, or dozens of microseconds, the switching time period is not limited in one first sub-time unit. Optionally, the switching time period may be a time period in one first sub-time unit, or may be one or several first sub-time units.

In this embodiment of the present invention, an analog beam corresponding to the common channel and/or the common reference signal is switched in the switching time period in the first sub-time unit in the first time unit in the radio time window. Specifically, in the switching time period, virtual weighting of multiple antenna elements may be adjusted or switched for the common channel and/or the common reference signal. The transmission time period is a transmission time period in the first sub-time unit, for example, the common channel and/or the common reference signal are/is transmitted in the transmission time period other than the switching time period in the first sub-time unit.

In some embodiments of the present invention, in addition to the switching time period, the transmission time period exists in the first sub-time unit, and the first sub-time unit includes the switching time period and the transmission time period. Alternatively, in addition to the switching time period, the transmission time period and a cyclic prefix time period exist in the first sub-time unit, and the first sub-time unit includes the switching time period, the transmission time period, and the cyclic prefix time period. When the first sub-time unit includes the switching time period and the transmission time period, optionally, the switching time period in the first sub-time unit may be obtained by replacing a cyclic prefix (CP) of the common channel and/or the common reference signal that are/is transmitted in the transmission time period. That is, a time period that is originally used as the CP in the first sub-time unit is reserved as the switching time period. When the first sub-time unit includes the switching time period, the transmission time period, and the cyclic prefix time period, the cyclic prefix time period is used to transmit a CP of the common channel and/or the common reference signal. That is, in addition to the switching time period and the transmission time period, the first sub-time unit includes the cyclic prefix time period, and the cyclic prefix time period is used to transmit the CP of the common channel and/or the common reference signal. Therefore, a time period occupied by the CP is not reserved as the switching time period. In the following, an example that the radio time window is specifically a radio frame is used for description. The first time unit is specifically a first subframe, a sub-time unit is specifically a symbol in a subframe, and the first sub-time unit is specifically a first symbol in the first subframe. In this case, a normal CP in the first symbol at an interval of at least N symbols in the first subframe is retained, and a switching time period is reserved in a time period other than a time period of the CP in the first symbol at an interval of at least N symbols in the first subframe, and is used to perform analog beam switching. Alternatively, a normal CP in the first symbol at an interval of at least N symbols in the first subframe is replaced with a switching time period, and in this case, the switching time period is used to perform analog beam switching.

In the description given by using one example, when it is determined that the switching time period is reserved in the first symbol at an interval of at least N symbols in the first subframe, the reserved switching time period may not occupy the normal CP but occupy the time period other than the time period of the CP in the first symbol at an interval of at least N symbols in the first subframe, for example, occupy an end of the first symbol. In this way, an original normal CP in a radio subframe may be retained. In the description given by using another example, when it is determined that the switching time period is reserved in the first symbol at an interval of at least N symbols in the first subframe, the reserved switching time period may occupy the normal CP, so that the normal CP is replaced with the switching time period for analog beam switching. In an OFDM system, orthogonality of all subcarriers is implemented by using the normal CP. According to the step, the normal CP is replaced with the switching time period, and orthogonality of all the subcarriers is damaged. Therefore, compared with a frame structure design in the OFDM system in which the cyclic prefix time period is still reserved for use of the normal CP, transmission performance corresponding to a frame structure design in the OFDM system in which the normal CP is replaced with the switching time period is greatly deteriorated.

It should be noted that, in this embodiment of the present invention, there may be one or more symbols in which the switching time period is reserved in the first subframe. For example, the switching time period is reserved in each symbol at an interval of at least N symbols in the first subframe in the radio frame, and is used to perform analog beam switching. The common channel and/or the common reference signal are/is transmitted based on the first subframe. The switching time period is reserved in each symbol at an interval of at least N symbols in the first subframe, and is used to perform analog beam switching. Transmission of the common channel and/or the common reference signal in the first subframe can ensure that flexible analog beam switching can be performed based on a granularity of per symbol for the common channel and/or the common reference signal. In addition, in a design of each symbol in the first subframe, the normal CP may be retained. For example, based on a structure of an OFDM symbol in a current LTE system, a normal CP in a current OFDM symbol is retained, and a switching time period is reserved in a time period other than the normal CP, for example, at an end of each symbol, and is used to perform analog beam switching. Referring to FIG. 2-a, FIG. 2-a is a schematic diagram of a frame structure of a first subframe according to an embodiment of the present invention. The first subframe includes two timeslots (slot), and illustration is given by using a frame structure of one timeslot as an example. One timeslot includes six symbols, and each symbol is represented by $N_{CP\text{-}OFDM}$. A normal CP in each symbol is retained, and a switching time period for analog beam switching is reserved at an end of each symbol. In the diagram, a black block is used to represent the normal CP, a gray block is used to represent the common channel and/or the common reference signal, and a white block is used to represent the switching time period for analog beam switching. Because the switching time period for analog beam switching is reserved in the first symbol in the first subframe, analog beam switching can be performed at a symbol-level granularity in the first subframe.

In some embodiments of the present invention, each symbol at an interval of at least N symbols in the first subframe in the radio frame may have a structure in which the normal CP is not retained. That is, the time period of the normal CP in each symbol is replaced with the switching time period to perform analog beam switching, and analog beam switching is completed by using the switching time period. Referring to FIG. 2-b, FIG. 2-b is a schematic diagram of another frame structure of a first subframe according to an embodiment of the present invention. The first subframe includes two timeslots, and illustration is given by using a frame structure of one timeslot as an example. One timeslot includes six symbols, and each symbol is represented by $N_{CP\text{-}OFDM}$. A normal CP in each symbol is not retained, and the original normal CP is replaced with a switching time period. In the diagram, a gray block is used to represent the common channel and/or the common reference signal, and a white block is used to represent the switching time period for analog beam switching. Because the switching time period for analog beam switching is reserved in the first symbol in the first subframe, analog beam switching can be performed at a symbol-level granularity in the first subframe.

Further, that the common channel and/or the common reference signal specifically represent/represents different channels is described by using an example. For example, a PBCH in the current Long Term Evolution (LTE) system is transmitted in the first four symbols in the second timeslot in the first subframe in each of multiple consecutive frames. Therefore, for the PBCH, analog beam switching may be switching performed at an interval of four symbols, that is, analog beam switching may be performed for the PBCH at an interval of at least four symbols. Referring to FIG. 2-C, FIG. 2-C is a schematic diagram of a frame structure of PBCH transmission in a first subframe according to an embodiment of the present invention. Transmission of one PBCH lasts for 40 milliseconds (ms). One radio frame is 10 ms. Each first subframe includes two timeslots. Each timeslot includes seven symbols. The PBCH is transmitted in the first four symbols in the second timeslot in the first subframe. That is, when the common channel and/or the common reference signal are/is specifically a broadcast channel, a value of a quantity N of symbols is 4. Therefore, a time period may be reserved in a symbol at an interval of at least four symbols in the first subframe, and is used to perform analog beam switching.

It may be understood that, a case in which a transmission time sequence of the broadcast channel in a high frequency scenario has another design different from that in current LTE is not excluded. In this case, analog beam switching in this embodiment of the present invention is still applicable, and adaptively varies with a quantity of symbols in a transmission subframe that are occupied by the broadcast channel. That is, practical switching varies with the quantity of symbols occupied by the broadcast channel.

Referring to FIG. 2-d, FIG. 2-d is a schematic diagram of a frame structure of PSS/SSS transmission in a first subframe according to an embodiment of the present invention. For a PSS/SSS, in a current LTE FDD frame structure, the PSS/SSS is respectively transmitted in the last two symbols in the first timeslot in a transmission subframe in which the PSS/SSS is located, that is, the PSS and the SSS each occupy one symbol. Therefore, for the PSS/SSS, analog beam switching may be switching performed at an interval of two symbols, that is, analog beam switching is performed at a time granularity of two symbols. For example, analog beam switching is performed, in a final part of every two symbols, in the transmission subframe in which the PSS/SSS is located.

For a PDCCH, in the current LTE system, a configurable quantity of symbols may be any one of 1, 2, 3, 4, or the like. Therefore, a switching time period for analog beam switching corresponding to the PDCCH may be configured at an interval of a configured quantity of symbols of the PDCCH, that is, analog beam switching is performed for the PDCCH at an interval of at least N symbols.

It may be understood that, in the embodiment of the present invention, a case in which a transmission time sequence of the common channel and/or the common reference signal in a high frequency scenario has a new design different from that in the current LTE system is not excluded. For example, a system frame structure is a structure different from that in the current LTE system. Both quantities of symbols, in all subframes, that are occupied by the common channel and/or the common reference signal and locations, in all the subframes, of the common channel and/or the common reference signal are also different. However, basic principles are similar. That is, analog beam switching may be related to a quantity of symbols occupied by the common channel and/or the common reference signal in one-time transmission. Because analog beam switching can be performed at a minimum granularity (that is, a symbol) in a time domain, analog beam switching can be flexibly performed at various granularities in the time domain. For example, analog beam switching may be performed at an interval of at least one symbol, or at an interval of at least one timeslot, or at an interval of at least one subframe, or at an interval of at least one radio frame. This specifically depends on the transmission time sequence of the common channel and/or the common reference signal and the quantity of occupied symbols.

In some embodiments of the present invention, the configuration information of the first time unit is dynamically notified to user equipment by using downlink control signaling, or is notified to user equipment by using higher layer signaling. That is, a base station may dynamically notify of the configuration information by using the downlink control signaling, or may semi-statically notify the user equipment of the configuration information by using the higher layer signaling. For example, the base station dynamically notifies the user equipment of the configuration information by adding the configuration information into the downlink control signaling, that is, dynamically notifies the user equipment of the configuration information of the first time unit by adding the configuration information of the first time unit into the downlink control signaling. Optionally, the notification may be indication signaling of a bitmap. For another example, the base station may semi-statically configure the configuration information by using the higher layer signaling, and the semi-static configuration is longer-period configuration compared with fast dynamic configuration. Optionally, the configuration information of the first time unit may be semi-statically notified by using radio resource control (RRC) signaling or other higher layer signaling. For example, i-bit higher layer signaling is used to notify whether a time unit is the first time unit, or the higher layer signaling is used to configure a set of first time units. The configuration may be in a form of a bitmap (bitmap). An example that the radio time window is specifically a radio frame, and a time unit is specifically a subframe is used. A bitmap of 10 subframes in one radio frame may be represented as 0011011001 indicating that the third, the fourth, the sixth, the seventh, and the tenth subframes are first subframes, and other subframes are second subframes. Herein, it is assumed that 0 represents the second subframe, and 1 represents the first subframe. Certainly, 0 may represent the first subframe, and 1 may represent the second subframe.

In some other embodiments of the present invention, the configuration information that is of the first time unit occupied in transmission of the common channel and/or the common reference signal and is notified to the user equipment may include a time configuration number of the first time unit, and the time configuration number is a configuration that is determined according to a configuration period and that is of the first time unit occupied in transmission of the common channel and/or the common reference signal. That is, the configuration information of the first time unit carries the time configuration number of the first time unit. The user equipment determines the time configuration number of the first time unit by parsing the configuration information of the first time unit, and obtains a specific configuration of the first time unit according to a specific time configuration number.

In the following, for example, an example that the radio time window is specifically a radio frame is used for description. The first time unit is specifically a first subframe, a sub-time unit is specifically a symbol in a subframe, and the first sub-time unit is specifically a first symbol in the first subframe. The first subframe in which the switching time period is reserved is defined as a switching subframe. Analog beam switching can be performed for the common channel and/or the common reference signal only in the switching subframe. As shown in FIG. 2-e, FIG. 2-e is a schematic diagram of a frame structure of a radio frame according to an embodiment of the present invention. Each subframe (sf) is 1 ms, one radio frame includes a total of 10 sfs. Only some of the subframes are switching subframes (that is, first subframes). The base station may predefine a periodic time configuration, notify, by using higher layer signaling, different time configuration numbers corresponding to different configuration periods, and perform analog beam switching according to a configuration corresponding to a number. Referring to the following Table 1, Table 1 is a configuration table that is of a time configuration and is provided in this embodiment of the present invention:

TABLE 1

| Configuration number | Configuration period | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 2 ms | S | N | S | N | S | N | S | N | S | N |
| 1 | 5 ms | S | N | N | N | N | S | N | N | N | N |
| 2 | 10 ms | S | N | N | N | N | N | N | N | N | N |
| ... | ... | | | | | | | | | | |

Specifically, in Table 1, each row in the table represents a subframe configuration option. S in Table 1 represents a switching subframe, and N represents a normal subframe. For example, the second row represents a switching configuration option in which a configuration period is five subframes. When it is assumed that a quantity of subframes included in one frame is 10, in this option, a subframe whose number is 0 is configured as the switching subframe, subframes whose numbers are 1, 2, 3, and 4 are configured as normal subframes, a subframe whose number is 5 is configured as the switching subframe, and subframes whose numbers are 6, 7, 8, and 9 are configured as normal subframes. Therefore, the second row represents a subframe configuration in which the configuration period is 5.

In the embodiment of the present invention, a scenario in which the switching time period is reserved in the first subframe and is used to perform analog beam switching is described. Further, a manner for configuring the switching time period is described in the present embodiments by using the following embodiment. Specifically, the switching time period is determined according to a predefined switching time configuration index. In an implementation of how to configure the switching time period, a switching time configuration index may be predefined, and one configuration index is corresponding to one time length. Therefore, when a switching time configuration index is selected, it is equivalent to that which time length is used as the switching time period is determined, so that a time length of the switching time period for analog beam switching can be determined. For example, referring to the following Table 2, Table 2 is a configuration table that is of a switching time configuration index and is provided in this embodiment of the present invention:

TABLE 2

| Configuration index | Switching time |
|---|---|
| 0 | 0 |
| 1 | 1/4 |
| 2 | 1/3 |
| 3 | 1/2 |
| 4 | 3/4 |
| 5 | 2 |
| 6 | 1 |

For example, to support flexible switching time, the switching time configuration index is further notified by using higher layer signaling, and a time length of a corresponding switching time period is configured according to the configuration. For example, when the configuration index is 0, it indicates that no switching time is configured. When the configuration index is 1, it indicates that the switching time is configured at a time interval of 1/4 of sub-time units.

In some other embodiments of the present invention, there may be another implementation of configuring the switching time period. For example, the implementation may be a design similar to that of an Extended CP in an existing standard. An example that the radio time window is specifically a radio frame is used for description. The first time unit is specifically a first subframe, a sub-time unit is specifically a symbol in a subframe, and the first sub-time unit is specifically a first symbol in the first subframe. A quantity of symbols carried in the first subframe when the first subframe includes no switching time period for analog beam switching is defined as $N_1$, a quantity of symbols in the first subframe when the first subframe includes the switching time period for analog beam switching is defined as $N_2$, and $N_1 > N_2$, so that (subframe length/$N_2$−subframe length/$N_1$) can be used as the time length of the switching time period for analog beam switching.

In some embodiments of the present invention, the time unit determining module 101 is further configured to determine configuration information of a second time unit in the radio time window, where the second time unit includes multiple sub-time units, the last M sub-time units are reserved in the second time unit to form a switching time period, the switching time period in the second time unit is used to perform analog beam switching for a traffic channel, and M is a natural number.

The data transmission module 102 is further configured to transmit the traffic channel in the second time unit according to the configuration information of the second time unit, where the traffic channel is transmitted in a sub-time unit other than the last M sub-time units in the second time unit.

In the embodiment of the present invention, a scenario in which the switching time period is reserved in the first time unit in the radio time window and is used to perform analog beam switching is described. A step that may be performed by the time unit determining module 101 is as follows: In addition to the first time unit, the radio time window includes the second time unit. Different from the first time unit, the second time unit is a time unit used to transmit the traffic channel. Optionally, a time length of the first sub-time unit in which the switching time period used to perform analog beam switching is reserved in the first time unit is greater than or equal to a time length of a sub-time unit in which no switching time period is reserved in the first or the second time unit. That is, subcarrier spacing corresponding to the first sub-time unit in the first time unit is less than or equal to subcarrier spacing corresponding to the sub-time unit in which no switching time period is reserved in the first or the second time unit. Further, it may be configured that a quantity of sub-time units included in the second time unit is greater than or equal to a quantity of sub-time units included in the first time unit. By configuring time units with different configurations in the radio time window, a time unit with a configuration may be specifically selected according to different transmitted data.

For example, the radio time window is specifically a radio frame, the first time unit is specifically a first subframe, a sub-time unit is specifically a symbol in a subframe, and the second time unit is specifically a second subframe. The first subframe is used to transmit the common channel and/or the common reference signal. Different from the first subframe, the second subframe is a subframe used to transmit the traffic channel. In a practical system, because transmission of the traffic channel and channel quality information measurement is performed on a per subframe basis, an analog beam used in each time of data transmission is usually switched and changed on a per subframe basis. Therefore, the switching time period does not need to be reserved in all symbols in the second subframe, and is used to perform analog beam switching. Instead, the last M symbols in each second subframe may be reserved as the switching time period for analog beam switching. For example, when M is 2, only the last two symbols in each second subframe are reserved, and are used to perform analog beam switching, and the traffic channel is transmitted in a symbol other than the last two symbols in the second subframe. Optionally, a normal CP in each symbol in the second subframe is retained. A step performed by the data transmission module 102 is as follows: The last M sub-time units in the second time unit are used as the switching time period for analog beam switching, and the traffic channel is transmitted in the sub-time unit other than the last M sub-time units in the second time unit. For example, there are a total of 10 sub-time units in the second time unit. If a value of M is 3, in the second time unit, the eighth, the ninth, and the tenth sub-time units are used as switching time periods for analog beam switching, and the first, the second, the third, the fourth, the fifth, the sixth, and the seventh sub-time units may be used to transmit the traffic channel.

In some other embodiments of the present invention, the time unit determining module 101 is further configured to determine configuration information of a second time unit in the radio time window, where the second time unit includes multiple sub-time units, a switching time period and a transmission time period are reserved in the last sub-time unit in the second time unit, and the switching time period in the second time unit is used to perform analog beam switching for a traffic channel.

The data transmission module 102 is further configured to transmit the traffic channel in the second time unit according to the configuration information of the second time unit, where the traffic channel is transmitted in a sub-time unit other than the last sub-time unit in the second time unit and in the transmission time period in the last sub-time unit.

Further, a time period length of the transmission time period in the last sub-time unit in the second time unit is less than or equal to a length of a time period that is used to transmit the traffic channel and that is in the sub-time unit other than the last sub-time unit in the second time unit.

In the embodiment of the present invention, a scenario in which the switching time period is reserved in the first time unit in the radio time window and is used to perform analog beam switching is described. A step that may be performed by the time unit determining module 101 is as follows: In addition to the first time unit, the radio time window includes the second time unit. Different from the first time unit, the second time unit is a time unit used to transmit the traffic channel. For example, the radio time window is specifically a radio frame, the first time unit is specifically a first subframe, a sub-time unit is specifically a symbol in a subframe, and the second time unit is specifically a second subframe. The first subframe is used to transmit the common channel and/or the common reference signal. Different from the first subframe, the second subframe is a subframe used to transmit the traffic channel. In a practical system, because transmission of the traffic channel and channel quality information measurement is performed on a per subframe basis, an analog beam used in each time of data transmission is usually switched and changed on a per subframe basis. Therefore, the switching time period does not need to be reserved in all symbols in the second subframe, and is used to perform analog beam switching. Instead, the switching time period and the transmission time period may be reserved in the last symbol in each second subframe, and the switching time period is used to perform analog beam switching. A step that may be performed by the data transmission module 102 is as follows: The switching time period for analog beam switching is reserved in the last sub-time unit in the second time unit, the sub-time unit other than the last sub-time unit in the second time unit is still idle, and the traffic channel may be transmitted in the sub-time unit other than the last sub-time unit in the second time unit. In addition, the transmission time period reserved in the last sub-time unit in the second time unit may also be used to transmit the traffic channel.

Optionally, in some embodiments of the present invention, the time period length of the transmission time period in the last sub-time unit in the second time unit is less than or equal to the length of the time period that is used to transmit the traffic channel and that is in the sub-time unit other than the last sub-time unit in the second time unit. For example, the switching time period in the last sub-time unit in the second time unit is used to perform analog beam switching. That is, the traffic channel can be transmitted only in the transmission time period other than the switching time period in the last sub-time unit in the second time unit, and the switching time period used to perform analog beam switching does not need to be reserved in the sub-time unit other than the last sub-time unit in the second time unit. In this case, the length of the time period that is in the last sub-time unit and is used to transmit the traffic channel is less than the length of the time period that is used to transmit the traffic channel and that is in the sub-time unit other than the last sub-time unit in the second time unit.

In the following, for example, an example that the radio time window is specifically a radio frame is used for description. The first time unit is specifically a first subframe, the second time unit is specifically a second subframe, a sub-time unit is specifically a symbol in a subframe, and the first sub-time unit is specifically a first symbol in the first subframe. Specifically, for an analog beam, normal CPs in the last M symbols in the second subframe may be retained, and switching time periods are reserved at ends of the last M symbols in the second subframe, and are used to perform analog beam switching. Alternatively, normal CPs in the last M symbols in the second subframe are replaced with switching time periods for analog beam switching. Alternatively, the traffic channel is not transmitted in the last M symbols in the second subframe, and the last M symbols in the second subframe are entirely used to perform analog beam switching. That is, the normal CPs in the last M symbols in the second subframe may be still retained, and the switching time periods for analog beam switching occupy the ends of the last M symbols in the second subframe. In this way, an original normal CP in the radio frame may be retained. Alternatively, when it is determined that the switching time periods are reserved in the last M symbols in the second subframe, the reserved switching time periods occupy the normal CPs, so that the normal CPs can be replaced with the switching time periods for analog beam switching. Alternatively, when the traffic channel is not transmitted in the last M symbols in the second subframe but transmitted only in a symbol other than the last M symbols in the second subframe, the last M symbols are entirely used as the switching time period for analog beam switching.

It should be noted that, in the embodiment of the present invention, because the last symbol is designed differently from a symbol prior to the last symbol (reservation of the switching time period for analog beam switching is added in the last symbol), subcarrier spacing corresponding to the last symbol in each second subframe needs to be increased, so as to ensure that a length of the last symbol is equal to a length of another symbol prior to the last symbol, that is, the subcarrier spacing corresponding to the last symbol is greater than subcarrier spacing corresponding to the another symbol. Alternatively, during data transmission, the last symbol in a subframe in which analog beam switching is performed is punctured, that is, the last symbol is not used to transmit the traffic channel, but is entirely used to perform analog beam switching.

In the following, for example, the traffic channel is usually transmitted by using a subframe as a minimum time granularity, and channel quality information (such as precoding information and rank indication information) measurement and feedback are also performed on a subframe basis. That is, it is enough to reserve analog beam switching time at a subframe level. Therefore, the traffic channel may be transmitted based on the second subframe, and a time period of an empty CP is reserved in the last symbol in each second subframe, and is used as the switching time period for analog beam switching, so that analog beam switching is performed at a granularity of a subframe. Likewise, the last symbol in the second subframe may have a structure in which a time period of a normal CP is retained. For example, based on a current OFDM symbol, a normal CP in the current OFDM symbol is retained, partial analog beam switching time is reserved at a final part of each symbol, and a symbol other than the last symbol still maintains a structure in which a normal CP and valid data exist. Referring to FIG. 2-f, FIG. 2-f is a schematic diagram of a frame structure of a second subframe according to an embodiment of the present invention.

For another example, the last symbol in the second subframe may have a structure in which a time period of a normal CP is not retained. That is, in the last symbol, the time period of the normal CP is replaced with a time period of an empty CP, so as to complete analog beam switching, and a symbol other than the last symbol still maintains a structure in which a normal CP and valid data exist. Referring to FIG. 2-g, FIG. 2-g is a schematic diagram of another frame structure of a second subframe according to an embodiment of the present invention.

Optionally, the switching time period is reserved in each timeslot in the second subframe in the radio frame, and is used to perform analog beam switching. That is, the switching time period may be reserved at a timeslot level or a subframe level. Referring to FIG. 2-h, FIG. 2-h is a schematic diagram of another frame structure of a second subframe according to an embodiment of the present invention, where 1sf represents one second subframe, each second subframe includes two timeslots, a white block represents the traffic channel, and a black block represents the switching time period for analog beam switching. Generally, the switching time period for analog beam switching may also be reserved at a granularity of a radio frame or a hyper frame. For example, when the radio frame is used as the granularity, a time interval between switching time periods for two times of analog beam switching is greater than or equal to a length of one radio frame.

In some embodiments of the present invention, referring to FIG. 1-b, the data transmission apparatus 100 further includes a configuration module 103, configured to configure, for the user equipment, a process for performing, in each sub-time unit in the first time unit, channel state information (CSI) measurement on a pilot resource.

That is, this embodiment of the present invention may include: configuring, for the user equipment, a process for performing, in the first time unit, CSI measurement on a pilot signal. For example, when the common channel and/or the common reference signal are/is transmitted in the first sub-time unit in the first time unit, the process for performing, in the first time unit, CSI measurement on the pilot signal is configured for the user equipment. In the following, for example, an example that the radio time window is a radio frame is used for description. The first time unit is specifically a first subframe, the second time unit is specifically a second subframe, a sub-time unit is specifically a symbol in a subframe, and the first sub-time unit is specifically a first symbol in the first subframe. Further, to determine a quantity relationship between a quantity of symbols included in the first subframe and a quantity of symbols included in the second subframe, a time length of the first subframe and that of the second subframe may be aligned. That is, when the time length of the first subframe and that of the second subframe are the same, because a length of a symbol in the first subframe is greater than or equal to a length of a symbol in the second subframe, it is determined that the quantity of symbols in the first subframe is less than or equal to the quantity of symbols in the second subframe.

In the embodiment, the first subframe may be used to transmit only the common channel and/or the common reference signal. In this case, entire bandwidth in each symbol in each subframe is entirely used to transmit the common channel and/or the common reference signal. The common channel and some common reference signals include but are not limited to a control channel, a synchronization signal, a broadcast channel, a control format indicator channel, an acknowledgement (ACK)/negative acknowledgement (NACK) information transmission channel, or the like. However, because a quantity of bits for transmitting the common channel/signal is relatively small, the common channel/signal does not need to be transmitted by using full bandwidth. Therefore, the traffic channel may also be transmitted in the first subframe. Specifically, when the common channel is transmitted on a per symbol basis, the traffic channel may also be correspondingly transmitted. Because analog beam switching is performed at a symbol level for the common channel and/or the common reference signal, analog beams in different symbols may be different. In this case, CSI measurement and reporting may be performed on a per symbol basis, that is, pilot resource measurement is performed at a symbol level, and CSI measurement and reporting are performed at a corresponding symbol level, where the former includes channel state information-reference signal (RS) resource configuration and the like, and the latter includes CSI process triggering and reporting that are performed at a symbol level, and the like. The base station triggers, in the first subframe, the user equipment to perform CSI measurement and feedback at a symbol level. The base station also needs to configure and notify each user equipment of symbols that are in the first subframe and in which the user equipment performs a same type of CSI measurement and feedback (for example, symbols having a same CSI-RS configuration belong to a same type, that is, a CSI-RS configuration is corresponding to a type of CSI measurement and feedback; or CSI-RS resource configurations corresponding to a same analog beam, and corresponding CSI measurement belong to a same type of CSI). The base station triggers and configures, in another subframe, CSI measurement and configuration performed at a subframe level. For CSI measurement and feedback that are performed by the user equipment, refer to the prior art. Details are not further described herein. Based on CSI measurement information of different types (or corresponding to different analog beams) in all symbols in the first subframe, the base station selects an analog beam corresponding to optimal CSI information, and may determine, in the second subframe according to a measurement result in the first subframe, whether to perform analog beam switching and an optimal analog beam after the switching.

It should be noted that, data transmitted in a radio frame is not distinguished in the prior art. Therefore, a time period of an empty CP is reserved in each symbol in each subframe for either the common channel and/or the common reference signal or the traffic channel, and is used to perform analog beam switching. In this embodiment of the present invention, first, the data transmission apparatus uses different subframe types and switching time reservation methods for different channels. Specifically, a switching time period is reserved in each transmission subframe (that is, the first subframe) of the common channel according to a quantity of symbols occupied by the common channel, and a switching time period is reserved only in the last symbol or the last several symbols in each subframe (the second subframe) in each transmission frame of the traffic channel. In addition, in this embodiment of the present invention, each symbol in the first subframe or the second subframe may further have a new structure based on OFDM, so that a normal CP in each symbol is retained, and the switching time period is reserved. By performing these operations, orthogonality in OFDM can be retained, and control and a service can be processed separately, thereby reducing overheads.

It can be learned from the embodiment description about the present invention that, first, configuration information of a first time unit in a radio time window is determined. The first time unit includes multiple sub-time units, a switching time period and a transmission time period are reserved in a first sub-time unit at an interval of at least N sub-time units in the first time unit, and the switching time period is used to perform analog beam switching for a common channel and/or a common reference signal. Next, the common channel and/or the common reference signal are/is transmitted in the first sub-time unit in the first time unit according to the configuration information of the first time unit, and the common channel and/or the common reference signal are/is transmitted in the transmission time period in the first sub-time unit. Because a switching time period is reserved in a first sub-time unit at an interval of at least N sub-time units in a first time unit in a radio time window, and is used to perform analog beam switching, analog beam switching can be performed in the switching time period according to virtual weighting of antenna elements. A common channel and/or a common reference signal are/is not transmitted in the switching time period but transmitted in a transmission time period in the first sub-time unit. Because the first sub-time unit to which a preset switching time period belongs is a sub-time unit at an interval of at least N sub-time units in the first time unit, there is no need to configure a switching time period in each sub-time unit in each time unit in the radio time window, so that resource waste can be avoided.

In the foregoing embodiment, a data transmission apparatus provided in this embodiment of the present invention is described. In the following, another data transmission apparatus provided in an embodiment of the present invention is described. Referring to FIG. 3-*a*, a data transmission apparatus 300 provided in this embodiment of the present invention may include a time unit determining module 301 and a data transmission module 302.

The time unit determining module 301 is configured to determine configuration information of a second time unit in a radio time window, where the second time unit includes multiple sub-time units, the last M sub-time units are reserved in the second time unit to form a switching time period, the switching time period is used to perform analog beam switching for a traffic channel, and M is a natural number.

The data transmission module 302 is configured to transmit the traffic channel in the second time unit according to the configuration information of the second time unit, where the traffic channel is transmitted in a sub-time unit other than the last M sub-time units in the second time unit.

In some embodiments of the present invention, the configuration information of the second time unit includes a time configuration number of the second time unit, and the time configuration number is a configuration that is determined according to a configuration period and that is of the second time unit.

In some embodiments of the present invention, the data transmission module 302 is further configured to dynamically notify the configuration information of the second time unit to user equipment by using downlink control signaling, or notify the configuration information of the second time unit to user equipment by using higher layer signaling.

In some embodiments of the present invention, the time unit determining module 301 is further configured to determine configuration information of a first time unit in the radio time window, where the first time unit includes multiple sub-time units, a switching time period and a transmission time period are reserved in a first sub-time unit at an interval of at least N sub-time units in the first time unit, the switching time period in the first sub-time unit is used to perform analog beam switching for a common channel and/or a common reference signal, and N is a natural number.

The data transmission module 302 is further configured to transmit the common channel and/or the common reference signal in the first sub-time unit in the first time unit according to the configuration information of the first time unit, where the common channel and/or the common reference signal are/is transmitted in the transmission time period in the first sub-time unit.

In some embodiments of the present invention, referring to FIG. 3-*b*, the data transmission apparatus 300 further includes a configuration module 303, configured to configure, for the user equipment, a process for performing, in each sub-time unit in the first time unit, channel state information measurement on a pilot resource.

In some embodiments of the present invention, a quantity of sub-time units included in the second time unit is greater than or equal to a quantity of sub-time units included in the first time unit.

It should be noted that, the time unit determining module 301 and the data transmission module 302 are similar to the time unit determining module 101 and the data transmission module 102 that are described in the embodiment corresponding to FIG. 1-*a* and FIG. 1-*b*. For specific description, refer to the foregoing embodiment. Details are not described herein again.

In some embodiments of the present invention, the switching time period for analog beam switching is the last M sub-time units in the second time unit in the radio time window, and a time length of the switching time period is determined according to a predefined switching time configuration index. For example, reference may be made to the description given by using an example of Table 2.

In some embodiments of the present invention, the configuration information of the second time unit includes a time configuration number of the second time unit, and the time configuration number is a configuration that is determined according to a configuration period and that is of the second time unit occupied in transmission of the traffic channel. For example, reference may be made to the description given by using an example of Table 1.

In some embodiments of the present invention, the configuration information of the second time unit is dynamically notified to the user equipment by using the downlink control signaling, or is notified to the user equipment by using the higher layer signaling. That is, to notify the user equipment of a configuration of a sub-time unit that is in the second time unit and is used to transmit the traffic channel, a base station may dynamically notify of the configuration information by using the downlink control signaling, or may semi-statically notify the user equipment of the configuration information by using the higher layer signaling. For example, the base station dynamically notifies the user equipment of the configuration information by adding the configuration information into the downlink control signaling, that is, dynamically notifies the user equipment of the configuration information of the second time unit by adding the configuration information of the second time unit into the downlink control signaling. The notification may also be 1-bit indication signaling (which indicates whether a current time unit is the second time unit). For another example, the base station may semi-statically configure the configuration information by using the higher layer signaling, and the semi-static configuration is longer-period configuration compared with fast dynamic configuration. Optionally, the configuration information of the second time unit may be semi-statically notified by using RRC signaling or other higher layer signaling. For example, 1-bit higher layer signaling is used to notify that a time unit is the second time unit, or the higher layer signaling is used to configure a set of second time units. The configuration may be in a form of a bitmap.

It can be learned from the embodiment description about the present invention that, first, configuration information of a second time unit in a radio time window is determined. The second time unit includes multiple sub-time units, the last M sub-time units are reserved in the second time unit to form a switching time period, and the switching time period is used to perform analog beam switching for a traffic channel. Next, the traffic channel is transmitted in a sub-time unit other than the last M sub-time units in the second time unit according to the configuration information of the second time unit. Because the last M sub-time units are reserved in a second time unit in a radio time window, and are used to perform analog beam switching, analog beam switching can be performed in the switching time period according to virtual weighting of antenna elements. Because a preset switching time period includes the last M sub-time units in the second time unit, there is no need to configure a switching time period in each sub-time unit in the second time unit in the radio time window, so that resource waste can be avoided.

In the foregoing embodiment, a data transmission apparatus provided in this embodiment of the present invention is described. In the following, another data transmission apparatus provided in an embodiment of the present invention is described. The data transmission apparatus is different from the data transmission apparatus shown in FIG. 3-*a* and FIG. 3-*b*. Specifically, referring to FIG. 4, a data transmission apparatus 400 may include a time unit determining module 401 and a data transmission module 402.

The time unit determining module 401 is configured to determine configuration information of a second time unit in a radio time window, where the second time unit includes multiple sub-time units, a switching time period and a transmission time period are reserved in the last sub-time unit in the second time unit, and the switching time period is used to perform analog beam switching for a traffic channel.

The data transmission module 402 is configured to transmit the traffic channel in the second time unit according to the configuration information of the second time unit, where the traffic channel is transmitted in a sub-time unit other than the last sub-time unit in the second time unit and in the transmission time period in the last sub-time unit.

In some embodiments of the present invention, the configuration information of the second time unit includes a time configuration number of the second time unit, and the time configuration number is a configuration that is determined according to a configuration period and that is of the second time unit.

In some embodiments of the present invention, the data transmission module 402 is further configured to dynamically notify the configuration information of the second time unit to user equipment by using downlink control signaling, or notify the configuration information of the second time unit to user equipment by using higher layer signaling.

In some embodiments of the present invention, the switching time period for analog beam switching is in the last sub-time unit in the second time unit in the radio time window, and a time length of the switching time period is determined according to a predefined switching time configuration index. For example, reference may be made to the description given by using an example of Table 2.

In some embodiments of the present invention, the configuration information of the second time unit includes a time configuration number of the second time unit, and the time configuration number is a configuration that is determined according to a configuration period and that is of the second time unit occupied in transmission of the traffic channel. For example, reference may be made to the description given by using an example of Table 1.

In some embodiments of the present invention, the configuration information of the second time unit is dynamically notified to the user equipment by using the downlink control signaling, or is notified to the user equipment by using the higher layer signaling. That is, to notify the user equipment of a configuration of a sub-time unit that is in the second time unit and is used to transmit the traffic channel, a base station may dynamically notify of the configuration information by using the downlink control signaling, or may semi-statically notify the user equipment of the configuration information by using the higher layer signaling. For example, the base station dynamically notifies the user equipment of the configuration information by adding the configuration information into the downlink control signaling, that is, dynamically notifies the user equipment of the configuration information of the second time unit by adding the configuration information of the second time unit into the downlink control signaling. The notification may also be 1-bit indication signaling (which indicates whether a current time unit is the second time unit). For another example, the base station may semi-statically configure the configuration information by using the higher layer signaling, and the semi-static configuration is longer-period configuration compared with fast dynamic configuration. Optionally, the configuration information of the second time unit may be semi-statically notified by using RRC signaling or other higher layer signaling. For example, 1-bit higher layer signaling is used to notify whether a time unit is the second time unit, or the higher layer signaling is used to configure a set of second time units. The configuration may be in a form of a bitmap.

In some embodiments of the present invention, the time unit determining module 401 is further configured to determine configuration information of a first time unit in the radio time window, where the first time unit includes multiple sub-time units, a switching time period and a transmission time period are reserved in a first sub-time unit at an interval of at least N sub-time units in the first time unit, the switching time period in the first sub-time unit is used to perform analog beam switching for a common channel and/or a common reference signal, and N is a natural number.

The data transmission module 402 is further configured to transmit the common channel and/or the common reference signal in the first sub-time unit in the first time unit according to the configuration information of the first time unit, where the common channel and/or the common reference signal are/is transmitted in the transmission time period in the first sub-time unit.

It can be learned from the embodiment description about the present embodiments that, first, configuration information of a second time unit in a radio time window is determined. The second time unit includes multiple sub-time units, a switching time period and a transmission time period are reserved in the last sub-time unit in the second time unit, and the switching time period is used to perform analog beam switching. Next, transmission is performed in a sub-time unit other than the last sub-time unit in the second time unit and in the transmission time period other than the switching time period in the last sub-time unit. Because a switching time period is reserved in the last sub-time unit in a second time unit in a radio time window, and is used to perform analog beam switching, analog beam switching can be performed in the switching time period according to virtual weighting of antenna elements. Because a preset switching time period includes the switching time period in the last sub-time unit in the second time unit, there is no need to configure a switching time period in each sub-time unit in the second time unit in the radio time window, so that resource waste can be avoided.

Figure 5:
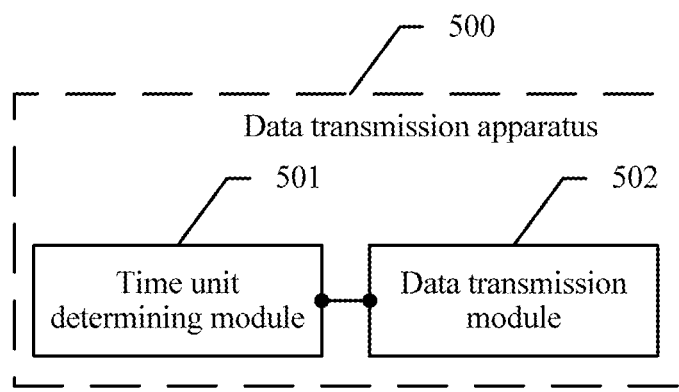
FIG. 5 is a schematic structural composition diagram of another data transmission apparatus according to an embodiment of the present invention.

In the foregoing embodiment, a data transmission apparatus provided in this embodiment of the present invention is described. In the following, another data transmission apparatus provided in an embodiment of the present invention is described. Referring to FIG. 5, a data transmission apparatus 500 provided in this embodiment of the present invention may include a time unit determining module 501 and a data transmission module 502.

The time unit determining module 501 is configured to determine configuration information of a third time unit in a radio time window, where the third time unit includes multiple sub-time units, the last M sub-time units are reserved in the third time unit to form a switching time period, the switching time period is used to perform analog beam switching for a common channel, or a common reference signal, or a traffic channel, and M is a natural number.

The data transmission module 502 is configured to transmit the common channel, or the common reference signal, or the traffic channel in the third time unit according to the configuration information of the third time unit, where the common channel, or the common reference signal, or the traffic channel is transmitted in a sub-time unit other than the last M sub-time units in the third time unit.

In some embodiments of the present invention, the configuration information of the third time unit includes a time configuration number of the third time unit, and the time configuration number is a configuration that is determined according to a configuration period and that is of the third time unit occupied in transmission of the common channel, or the common reference signal, or the traffic channel.

In some embodiments of the present invention, the data transmission module 502 is further configured to dynamically notify the configuration information of the third time unit to user equipment by using downlink control signaling, or notify the configuration information of the third time unit to user equipment by using higher layer signaling.

In this embodiment of the present invention, the time unit determining module 501 classifies data that needs to be transmitted in the radio time window, and uses, for different types of data, a switching time period configuration manner suitable for transmitting the data. The radio time window is a time domain resource used in transmitting a wireless signal. For example, with reference to a specific application scenario, a radio time window may be a wireless transmission time unit in a broad sense, or may be a specific transmission time unit such as a hyper frame, a radio frame in current LTE, a subframe, or a timeslot. All time units in each radio time window fall into three types. In addition to the first time unit and the second time unit that are described in the foregoing embodiment, each radio time window includes a type of time unit that is defined as the third time unit. The last M sub-time units are reserved in the third time unit to form the switching time period, and the switching time period is used to perform analog beam switching for the common channel, or the common reference signal, or the traffic channel. Analog beam switching described herein may be analog beam switching described in the foregoing embodiment. That is, the switching time period reserved in the third time unit may be used to perform analog beam switching.

For example, the radio time window is specifically a radio frame, the first time unit is specifically a first subframe, a sub-time unit is specifically a symbol in a subframe, and the third time unit is specifically a third subframe. Different from the first subframe and a second subframe, the third subframe is a subframe used to transmit the common channel, or the common reference signal, or the traffic channel. A time period does not need to be reserved in all symbols in the third subframe, to be used to perform analog beam switching. Instead, the last M symbols in each third subframe may be reserved, and used to perform analog beam switching. For example, when M is 2, only the last two symbols in each third subframe are reserved, and are used to perform analog beam switching. The common channel, or the common reference signal, or the traffic channel is transmitted in a symbol other than the last two symbols in the third subframe.

In this embodiment of the present invention, the last M sub-time units in the third time unit are used as the switching time period for analog beam switching, and the common channel, or the common reference signal, or the traffic channel is transmitted in the sub-time unit other than the last M sub-time units in the third time unit.

In some embodiments of the present invention, the switching time period for analog beam switching is the last M sub-time units in the third time unit in the radio time window, and a time length of the switching time period is determined according to a predefined switching time configuration index. For example, reference may be made to the description given by using an example of Table 2.

In some embodiments of the present invention, the configuration information of the third time unit includes a time configuration number of the third time unit, and the time configuration number is a configuration that is determined according to a configuration period and that is of the third time unit occupied in transmission of the common channel, or the common reference signal, or the traffic channel. For example, reference may be made to the description given by using an example of Table 1.

In some embodiments of the present invention, the configuration information of the third time unit is dynamically notified to the user equipment by using the downlink control signaling, or is notified to the user equipment by using the higher layer signaling. That is, to notify the user equipment of a configuration of a sub-time unit that is in the third time unit and is used to transmit the traffic channel, a base station may dynamically notify of the configuration information by using the downlink control signaling, or may semi-statically notify the user equipment of the configuration information by using the higher layer signaling. For example, the base station dynamically notifies the user equipment of the configuration information by adding the configuration information into the downlink control signaling, that is, dynamically notifies the user equipment of the configuration information of the third time unit by adding the configuration information of the third time unit into the downlink control signaling. The notification may also be 1-bit indication signaling (which indicates whether a current time unit is the third time unit). For another example, the base station may semi-statically configure the configuration information by using the higher layer signaling, and the semi-static configuration is longer-period configuration compared with fast dynamic configuration.

It can be learned from the embodiment description about the present invention that, first, configuration information of a third time unit in a radio time window is determined. The third time unit includes multiple sub-time units, and the last M sub-time units are reserved in the third time unit to form a switching time period in which analog beam switching is performed for a common channel, or a common reference signal, or a traffic channel. Next, the common channel, or the common reference signal, or the traffic channel is transmitted in a sub-time unit other than the last M sub-time units in the third time unit according to the configuration information of the third time unit. Because the last M sub-time units are reserved in a third time unit in a radio time window, and are used to perform analog beam switching, analog beam switching can be performed in the switching time period according to virtual weighting of antenna elements. Because a preset switching time period includes the last M sub-time units in the third time unit, there is no need to configure a switching time period in each sub-time unit in the third time unit in the radio time window, so that resource waste can be avoided.

Figure 6:
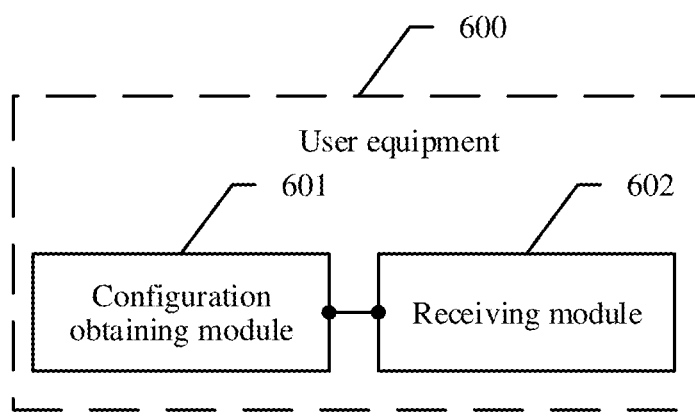
FIG. 6 is a schematic structural composition diagram of user equipment according to an embodiment of the present invention.

In the foregoing embodiment, a data transmission apparatus provided in this embodiment of the present invention is described on a base station implementation side. In the following, user equipment corresponding to the data transmission apparatus is described. Referring to FIG. 6, user equipment 60o provided in an embodiment of the present invention may include a configuration obtaining module 601 and a receiving module 602.

The configuration obtaining module 601 is configured to obtain configuration information of a first time unit in a radio time window, where the first time unit includes multiple sub-time units, a switching time period and a transmission time period are reserved in a first sub-time unit at an interval of at least N sub-time units in the first time unit, the switching time period is used to perform analog beam switching for a common channel and/or a common reference signal, and N is a natural number.

The receiving module 602 is configured to receive the common channel and/or the common reference signal in the transmission time period in the first sub-time unit.

For the user equipment, the method executed by the user equipment is corresponding to the method executed by the data transmission apparatus in the embodiment corresponding to FIG. 1-a and FIG. 1-b. The configuration obtaining module 601 in the user equipment determines the configuration information of the first time unit in the radio time window. The data transmission apparatus is located on a base station implementation side, and sends the configuration information of the first time unit in the radio time window to the user equipment. For a specific implementation and function of the configuration information, refer to the description in the foregoing embodiment. The user equipment obtains configuration content of the configuration information by means of parsing, and determines that data is to be transmitted in the transmission time period in the first sub-time unit. Therefore, the user equipment needs to be able to receive the common channel and/or the common reference signal in the transmission time period. The user equipment avoids, by parsing the configuration information of the first time unit, the switching time period for analog beam switching, so as to correctly receive the common channel and/or the common reference signal.

In some other embodiments of the present invention, the configuration obtaining module 601 is further configured to obtain configuration information of a second time unit in the radio time window, where the second time unit includes multiple sub-time units, the last M sub-time units are reserved in the second time unit to form a switching time period, the switching time period in the second time unit is used to perform analog beam switching for a traffic channel, and M is a natural number.

The receiving module 602 is configured to receive the traffic channel in a sub-time unit other than the last M sub-time units in the second time unit.

For the user equipment, the method executed by the user equipment is corresponding to the method executed by the data transmission apparatus in the embodiment corresponding to FIG. 3-a and FIG. 3-b. The configuration obtaining module in the user equipment determines the configuration information of the second time unit in the radio time window. The data transmission apparatus is located on the base station implementation side, and sends the configuration information of the second time unit in the radio time window to the user equipment. For a specific implementation and function of the configuration information, refer to the description in the foregoing embodiment. The user equipment obtains configuration content of the configuration information by means of parsing, and determines that data is to be transmitted in the sub-time unit other than the last M sub-time units in a second time unit. Therefore, the user equipment needs to be able to receive the traffic channel in the sub-time unit other than the last M sub-time units in the second time unit. The user equipment avoids, by parsing the configuration information of the second time unit, the switching time period for analog beam switching, so as to correctly receive the traffic channel.

In some other embodiments of the present invention, the configuration obtaining module 601 is further configured to obtain configuration information of a second time unit in the radio time window, where the second time unit includes multiple sub-time units, a switching time period and a transmission time period are reserved in the last sub-time unit in the second time unit, and the switching time period in the second time unit is used to perform analog beam switching for a traffic channel.

The receiving module 602 is further configured to receive the traffic channel in a sub-time unit other than the last sub-time unit in the second time unit and in the transmission time period in the last sub-time unit.

For the user equipment, the method executed by the user equipment is corresponding to the method executed by the data transmission apparatus in the embodiment corresponding to FIG. 4. The configuration obtaining module in the user equipment determines the configuration information of the second time unit in the radio time window. The data transmission apparatus is located on the base station implementation side, and sends the configuration information of the second time unit in the radio time window to the user equipment. For a specific implementation and function of the configuration information, refer to the description in the foregoing embodiment. The user equipment obtains configuration content of the configuration information by means of parsing, and determines that data is to be transmitted in the sub-time unit other than the last sub-time unit in the second time unit and in the transmission time period other than the switching time period in the last sub-time unit. Therefore, the user equipment needs to be able to receive the traffic channel in the sub-time unit other than the last sub-time unit in the second time unit and in the transmission time period other than the switching time period in the last sub-time unit. The user equipment avoids, by parsing the configuration information of the second time unit, the switching time period for analog beam switching, so as to correctly receive the traffic channel.

In some other embodiments of the present invention, the configuration obtaining module 601 is specifically configured to: receive the configuration information that is of the first time unit in the radio time window and is notified by using downlink control signaling or higher layer signaling; and receive the configuration information that is of the second time unit in the radio time window and is notified by using downlink control signaling or higher layer signaling.

Figure 7:
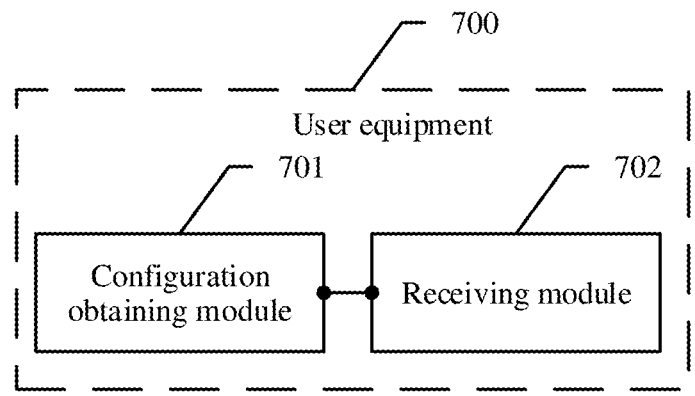
FIG. 7 is a schematic structural composition diagram of another user equipment according to an embodiment of the present invention.

In the foregoing embodiment, user equipment corresponding to a data transmission apparatus is described. Referring to FIG. 7, another user equipment 700 provided in an embodiment of the present invention may include a configuration obtaining module 701 and a receiving module 702.

The configuration obtaining module 701 is configured to obtain configuration information of a second time unit in a radio time window, where the second time unit includes multiple sub-time units, the last M sub-time units are reserved in the second time unit to form a switching time period, the switching time period is used to perform analog beam switching for a traffic channel, and M is a natural number.

The receiving module 702 is configured to receive the traffic channel in a sub-time unit other than the last M sub-time units in the second time unit.

In some embodiments of the present invention, the configuration obtaining module 701 is further configured to obtain configuration information of a first time unit in the radio time window, where the first time unit includes multiple sub-time units, a switching time period and a transmission time period are reserved in a first sub-time unit at an interval of at least N sub-time units in the first time unit, the switching time period in the first sub-time unit is used to perform analog beam switching for a common channel and/or a common reference signal, and N is a natural number.

The receiving module 702 is further configured to receive the common channel and/or the common reference signal in the transmission time period in the first sub-time unit.

In some embodiments of the present invention, the configuration obtaining module 701 is further configured to: receive the configuration information that is of the second time unit in the radio time window and is notified by using downlink control signaling or higher layer signaling; and receive the configuration information that is of the first time unit in the radio time window and is notified by using downlink control signaling or higher layer signaling.

For the user equipment, the method executed by the user equipment is corresponding to the method executed by the data transmission apparatus in the embodiment corresponding to FIG. 3-*a* and FIG. 3-*b*. The configuration obtaining module in the user equipment determines the configuration information of the second time unit in the radio time window. The data transmission apparatus is located on a base station implementation side, and sends the configuration information of the second time unit in the radio time window to the user equipment. For a specific implementation and function of the configuration information, refer to the description in the foregoing embodiment. The user equipment obtains configuration content of the configuration information by means of parsing, and determines that data is to be transmitted in the sub-time unit other than the last M sub-time units in a second time unit. Therefore, the user equipment needs to be able to receive the traffic channel in the sub-time unit other than the last M sub-time units in the second time unit. The user equipment avoids, by parsing the configuration information of the second time unit, the switching time period for analog beam switching, so as to correctly receive the traffic channel.

Figure 8:
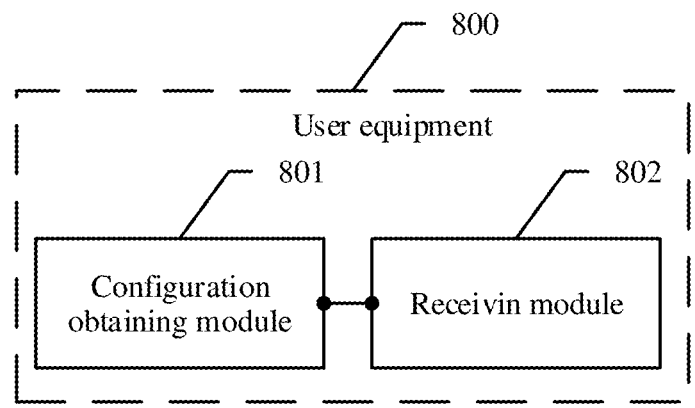
FIG. 8 is a schematic structural composition diagram of another user equipment according to an embodiment of the present invention.

In the foregoing embodiment, user equipment corresponding to a data transmission apparatus is described. Referring to FIG. 8, another user equipment 800 provided in an embodiment of the present invention may include a configuration obtaining module 801 and a receiving module 802.

The configuration obtaining module 801 is configured to obtain configuration information of a second time unit in a radio time window, where the second time unit includes multiple sub-time units, a switching time period and a transmission time period are reserved in the last sub-time unit in the second time unit, and the switching time period is used to perform analog beam switching for a traffic channel.

The receiving module 802 is configured to receive the traffic channel in a sub-time unit other than the last sub-time unit in the second time unit and in the transmission time period in the last sub-time unit.

In some embodiments of the present invention, the configuration obtaining module 801 is further configured to obtain configuration information of a first time unit in the radio time window, where the first time unit includes multiple sub-time units, a switching time period and a transmission time period are reserved in a first sub-time unit at an interval of at least N sub-time units in the first time unit, the switching time period in the first sub-time unit is used to perform analog beam switching for a common channel and/or a common reference signal, and N is a natural number.

The receiving module 802 is further configured to receive the common channel and/or the common reference signal in the transmission time period in the first sub-time unit.

In some embodiments of the present invention, the configuration obtaining module 801 is specifically configured to: receive the configuration information that is of the second time unit in the radio time window and is notified by using downlink control signaling or higher layer signaling; and receive the configuration information that is of the first time unit in the radio time window and is notified by using downlink control signaling or higher layer signaling.

For the user equipment, the method executed by the user equipment is corresponding to the method executed by the data transmission apparatus in the embodiment corresponding to FIG. 4. The configuration obtaining module in the user equipment determines the configuration information of the second time unit in the radio time window. The data transmission apparatus is located on a base station implementation side, and sends the configuration information of the second time unit in the radio time window to the user equipment. For a specific implementation and function of the configuration information, refer to the description in the foregoing embodiment. The user equipment obtains configuration content of the configuration information by means of parsing, and determines that data is to be transmitted in the sub-time unit other than the last sub-time unit in the second time unit and in the transmission time period other than the switching time period in the last sub-time unit. Therefore, the user equipment needs to be able to receive the traffic channel in the sub-time unit other than the last sub-time unit in the second time unit and in the transmission time period other than the switching time period in the last sub-time unit. The user equipment avoids, by parsing the configuration information of the second time unit, the switching time period for analog beam switching, so as to correctly receive the traffic channel.

Figure 9:
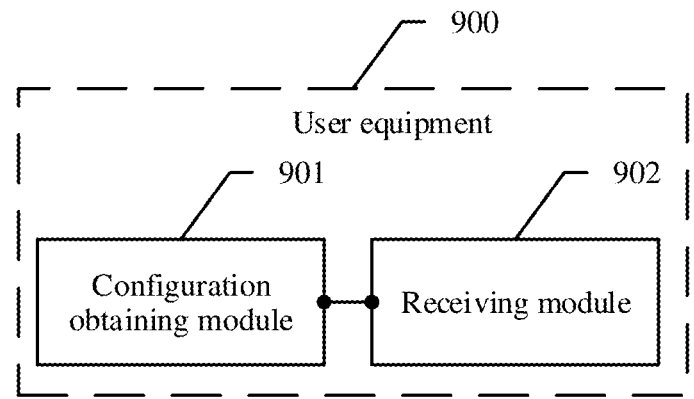
FIG. 9 is a schematic structural composition diagram of another user equipment according to an embodiment of the present invention.

In the foregoing embodiment, user equipment corresponding to a data transmission apparatus is described. Referring to FIG. 9, another user equipment 900 provided in an embodiment of the present invention may include a configuration obtaining module 901 and a receiving module 902.

The configuration obtaining module 901 is configured to obtain configuration information of a third time unit in a radio time window, where the third time unit includes multiple sub-time units, the last M sub-time units are reserved in the third time unit to form a switching time period, the switching time period is used to perform analog beam switching for a common channel, or a common reference signal, or a traffic channel, and M is a natural number.

The receiving module 902 is configured to receive the common channel, or the common reference signal, or the traffic channel in a sub-time unit other than the last M sub-time units in the third time unit.

Specifically, the configuration obtaining module 901 is specifically configured to receive the configuration information that is of the third time unit in the radio time window and is notified by using downlink control signaling or higher layer signaling.

For the user equipment, the method executed by the user equipment is corresponding to the method executed by the data transmission apparatus in the embodiment corresponding to FIG. 5. The configuration obtaining module in the user equipment determines the configuration information of the third time unit in the radio time window. The data transmission apparatus is located on a base station implementation side, and sends the configuration information of the third time unit in the radio time window to the user equipment. For a specific implementation and function of the configuration information, refer to the description in the foregoing embodiment. The user equipment obtains configuration content of the configuration information by means of parsing, and determines that data is to be transmitted in the sub-time unit other than the last M sub-time units in the third time unit. Therefore, the user equipment needs to be able to receive the common channel, or the common reference signal, or the traffic channel in the sub-time unit other than the last M sub-time units in the third time unit. The user equipment avoids, by parsing the configuration information of the third time unit, the switching time period for analog beam switching, so as to correctly receive the common channel, or the common reference signal, or the traffic channel.

It should be noted that, for brief description, the apparatus embodiments are described as a series of actions. However, persons skilled in the art should appreciate that the present embodiments is not limited to the described order of the actions, because according to the present embodiments, some steps may be performed in other orders or simultaneously. In addition, persons skilled in the art should also appreciate that all the embodiments described in the specification are embodiments, and the related actions and modules are not necessarily mandatory to the present embodiments.

An embodiment of the present invention further provides a computer storage medium. The computer storage medium stores a program, and the program performs some or all steps described in the method embodiments.

Figure 10:
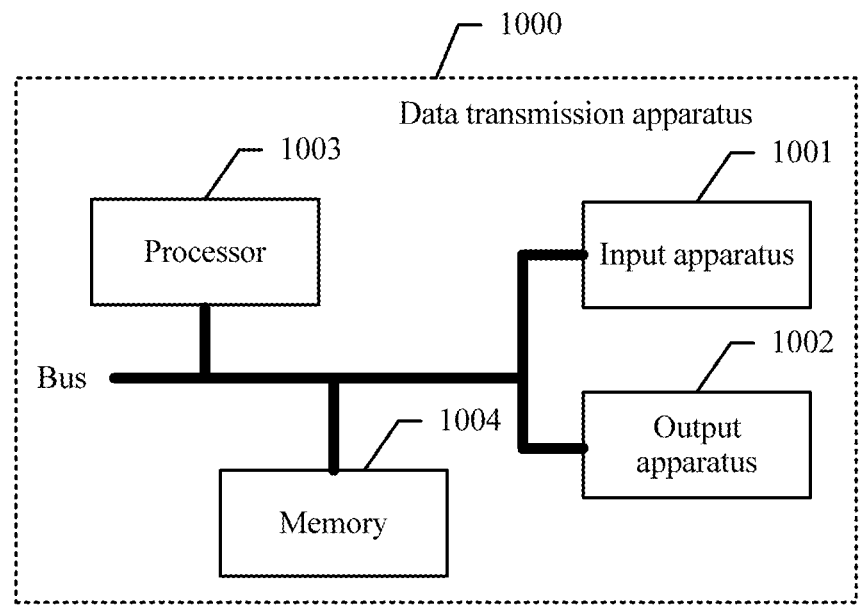
FIG. 10 is a schematic structural composition diagram of another data transmission apparatus according to an embodiment of the present invention.

In the following, another data transmission apparatus provided in an embodiment of the present invention is described. Referring to FIG. 10, a data transmission apparatus 1000 includes: an input apparatus 1001, an output apparatus 1002, a processor 1003, and a memory 1004 (there may be one or more processors 1003 in the data transmission apparatus 1000, and one processor is used as an example in FIG. 10). In some embodiments of the present invention, the input apparatus 1001, the output apparatus 1002, the processor 1003, and the memory 1004 may be connected by using a bus or in another manner. In FIG. 10, connection by using a bus is used as an example.

The processor 1003 is configured to perform the following steps: determining configuration information of a first time unit in a radio time window, where the first time unit includes multiple sub-time units, a switching time period and a transmission time period are reserved in a first sub-time unit at an interval of at least N sub-time units in the first time unit, the switching time period is used to perform analog beam switching for a common channel and/or a common reference signal, and N is a natural number; and transmitting the common channel and/or the common reference signal in the first sub-time unit in the first time unit according to the configuration information of the first time unit, where the common channel and/or the common reference signal are/is transmitted in the transmission time period.

In some embodiments of the present invention, N stored in the memory 1004 is a quantity of sub-time units in the first time unit that are occupied by the common channel and/or the common reference signal in each time of transmission in the first time unit.

In some embodiments of the present invention, the first sub-time unit stored in the memory 1004 includes the switching time period and the transmission time period; or the first sub-time unit includes the switching time period, the transmission time period, and a cyclic prefix time period.

In some embodiments of the present invention, the switching time period in the first sub-time unit stored in the memory 1004 is obtained by replacing a CP of the common channel and/or the common reference signal; or the cyclic prefix time period is used to transmit a CP of the common channel and/or the common reference signal.

In some embodiments of the present invention, the switching time period stored in the memory 1004 is determined according to a predefined switching time configuration index.

In some embodiments of the present invention, the configuration information of the first time unit stored in the memory 1004 includes a time configuration number of the first time unit, and the time configuration number is a configuration that is determined according to a configuration period and that is of the first time unit occupied in transmission of the common channel and/or the common reference signal.

In some embodiments of the present invention, the configuration information of the first time unit stored in the memory 1004 is dynamically notified to user equipment by using downlink control signaling, or is notified to user equipment by using higher layer signaling.

In some embodiments of the present invention, the processor 1003 is further configured to perform the following steps: determining configuration information of a second time unit in the radio time window, where the second time unit includes multiple sub-time units, the last M sub-time units are reserved in the second time unit to form a switching time period, the switching time period in the second time unit is used to perform analog beam switching for a traffic channel, and M is a natural number; and transmitting the traffic channel in the second time unit according to the configuration information of the second time unit, where the traffic channel is transmitted in a sub-time unit other than the last M sub-time units in the second time unit.

In some embodiments of the present invention, the processor 1003 is further configured to perform the following steps: determining configuration information of a second time unit in the radio time window, where the second time unit includes multiple sub-time units, a switching time period and a transmission time period are reserved in the last sub-time unit in the second time unit, and the switching time period in the second time unit is used to perform analog beam switching for a traffic channel; and transmitting the traffic channel in the second time unit according to the configuration information of the second time unit, where the traffic channel is transmitted in a sub-time unit other than the last sub-time unit in the second time unit and in the transmission time period in the last sub-time unit.

In some embodiments of the present invention, a time period length of the transmission time period in the last sub-time unit in the second time unit stored in the memory 1004 is less than or equal to a length of a time period that is used to transmit the traffic channel and that is in the sub-time unit other than the last sub-time unit in the second time unit.

In some embodiments of the present invention, the processor 1003 is further configured to perform the following step: configuring, for the user equipment, a process for performing, in each sub-time unit in the first time unit, channel state information measurement on a pilot resource.

In some embodiments of the present invention, a pilot resource measured in each sub-time unit stored in the memory 1004 is corresponding to a piece of pre-coding information.

In some embodiments of the present invention, a quantity of sub-time units included in the second time unit stored in the memory 1004 is greater than or equal to a quantity of sub-time units included in the first time unit.

In the following, another data transmission apparatus provided in an embodiment of the present invention is described, and the data transmission apparatus includes: an input apparatus, an output apparatus, a processor, and a memory (there may be one or more processors in the data transmission apparatus, and one processor is specifically used as an example). In some embodiments of the present invention, the input apparatus, the output apparatus, the processor, and the memory may be connected by using a bus or in another manner. Connection by using a bus is used as an example. The data transmission apparatus may be similar to the data transmission apparatus 1000 in FIG. 10.

The processor is configured to perform the following steps: determining configuration information of a third time unit in a radio time window, where the third time unit includes multiple sub-time units, the last M sub-time units are reserved in the third time unit to form a switching time period, the switching time period is used to perform analog beam switching for a common channel, or a common reference signal, or a traffic channel, and M is a natural number; and transmitting the common channel, or the common reference signal, or the traffic channel in the third time unit according to the configuration information of the third time unit, where the common channel, or the common reference signal, or the traffic channel is transmitted in a sub-time unit other than the last M sub-time units in the third time unit.

In some embodiments of the present invention, a time length of the switching time period stored in the memory is determined according to a predefined switching time configuration index.

In some embodiments of the present invention, the configuration information of the third time unit stored in the memory includes a time configuration number of the third time unit, and the time configuration number is a configuration that is determined according to a configuration period and that is of the third time unit occupied in transmission of the common channel, or the common reference signal, or the traffic channel.

In some embodiments of the present invention, the configuration information of the third time unit stored in the memory is dynamically notified to user equipment by using downlink control signaling, or is notified to user equipment by using higher layer signaling.

It can be learned from the embodiment description about the present invention that, first, configuration information of a first time unit in a radio time window is determined. A switching time period and a transmission time period are reserved in a first sub-time unit at an interval of at least N sub-time units in the first time unit, and the switching time period is used to perform analog beam switching for a common channel and/or a common reference signal. Next, the common channel and/or the common reference signal are/is transmitted in the first sub-time unit in the first time unit according to the configuration information of the first time unit, and the common channel and/or the common reference signal are/is transmitted in the transmission time period in the first sub-time unit. Because a switching time period is reserved in a first sub-time unit at an interval of at least N sub-time units in a first time unit in a radio time window, and is used to perform analog beam switching, analog beam switching can be performed in the switching time period according to virtual weighting of antenna elements. A common channel and/or a common reference channel are/is not transmitted in the switching time period but transmitted in a transmission time period in the first sub-time unit. Because the first sub-time unit to which a preset switching time period belongs is selected at an interval of at least N sub-time units in the first time unit, there is no need to configure a switching time period in each sub-time unit in each time unit in the radio time window, so that resource waste can be avoided.

Figure 11:
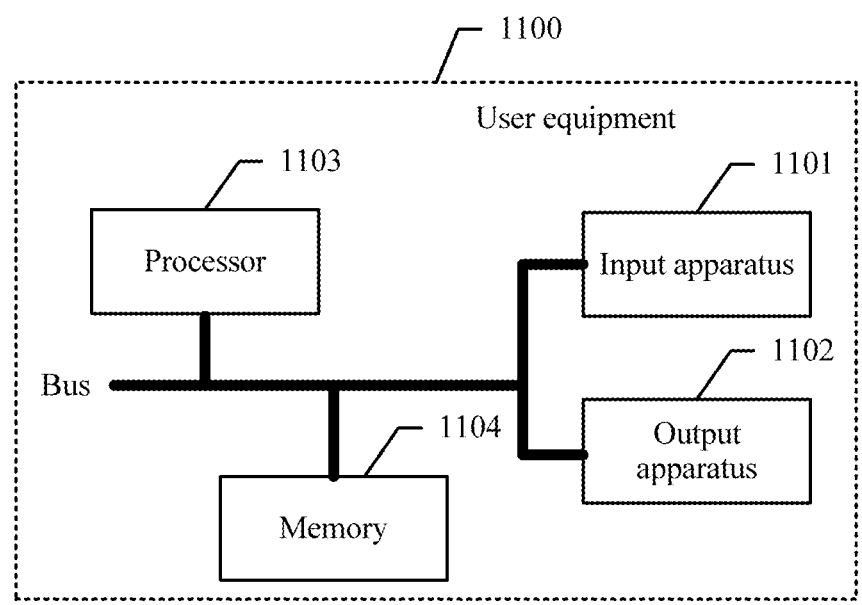
FIG. 11 is a schematic structural composition diagram of another user equipment according to an embodiment of the present invention.

In the following, another user equipment provided in an embodiment of the present invention is described. Referring to FIG. 11, user equipment 1100 includes: an input apparatus 1101, an output apparatus 1102, a processor 1103, and a memory 1104 (there may be one or more processors 1103 in the user equipment 1100, and one processor is used as an example in FIG. 11). In some embodiments of the present invention, the input apparatus 1101, the output apparatus 1102, the processor 1103, and the memory 1104 may be connected by using a bus or in another manner. In FIG. 11, connection by using a bus is used as an example.

The processor 1103 is configured to perform the following steps: obtaining configuration information of a first time unit in a radio time window, where the first time unit includes multiple sub-time units, a switching time period and a transmission time period are reserved in a first sub-time unit at an interval of at least N sub-time units in the first time unit, the switching time period is used to perform analog beam switching for a common channel and/or a common reference signal, and N is a natural number; and receiving the common channel and/or the common reference signal in the transmission time period.

In some embodiments of the present invention, the processor 1103 is further configured to perform the following steps: obtaining configuration information of a second time unit in the radio time window, where the second time unit includes multiple sub-time units, the last M sub-time units are reserved in the second time unit to form a switching time period, the switching time period in the second time unit is used to perform analog beam switching for a traffic channel, and M is a natural number; and receiving the traffic channel in a sub-time unit other than the last M sub-time units in the second time unit.

In some embodiments of the present invention, the processor 1103 is further configured to perform the following steps: obtaining configuration information of a second time unit in the radio time window, where the second time unit includes multiple sub-time units, a switching time period and a transmission time period are reserved in the last sub-time unit in the second time unit, and the switching time period in the second time unit is used to perform analog beam switching for a traffic channel; and receiving the traffic channel in a sub-time unit other than the last sub-time unit in the second time unit and in the transmission time period in the last sub-time unit.

In some embodiments of the present invention, the processor 1103 is specifically configured to perform the following steps: receiving the configuration information that is of the first time unit in the radio time window and is notified by using downlink control signaling or higher layer signaling; and receiving the configuration information that is of the second time unit in the radio time window and is notified by using downlink control signaling or higher layer signaling.

In the following, another user equipment provided in an embodiment of the present invention is described, and the user equipment includes: an input apparatus, an output apparatus, a processor, and a memory (there may be one or more processors in the user equipment, and one processor is specifically used as an example). In some embodiments of the present invention, the input apparatus, the output apparatus, the processor, and the memory may be connected by using a bus or in another manner. Connection by using a bus is used as an example. The user equipment may be similar to the user equipment 1100 in FIG. 11.

The processor is configured to perform the following steps: obtaining configuration information of a third time unit in a radio time window, where the third time unit includes multiple sub-time units, the last M sub-time units are reserved in the third time unit to form a switching time period, the switching time period is used to perform analog beam switching for a common channel, or a common reference signal, or a traffic channel, and M is a natural number; and receiving the common channel, or the common reference signal, or the traffic channel in a sub-time unit other than the last M sub-time units in the third time unit.

In some embodiments of the present invention, the processor 1103 is specifically configured to perform the following step: receiving the configuration information that is of the third time unit in the radio time window and is notified by using downlink control signaling or higher layer signaling.

It can be learned from the embodiment description about the present embodiments that, a data transmission apparatus determines configuration information of a first time unit in a radio time window. The data transmission apparatus is located on a base station implementation side, and sends the configuration information of the first time unit in the radio time window to user equipment. For a specific implementation and function of the configuration information, refer to the description in the foregoing embodiment. The user equipment obtains configuration content of the configuration information by means of parsing, and determines that data is to be transmitted in a transmission time period in a first sub-time unit. Therefore, the user equipment needs to be able to receive a common channel and/or a common reference signal in the transmission time period. The user equipment avoids, by parsing the configuration information of the first time unit, a switching time period for analog beam switching, so as to correctly receive the common channel and/or the common reference signal.

Figure 12:
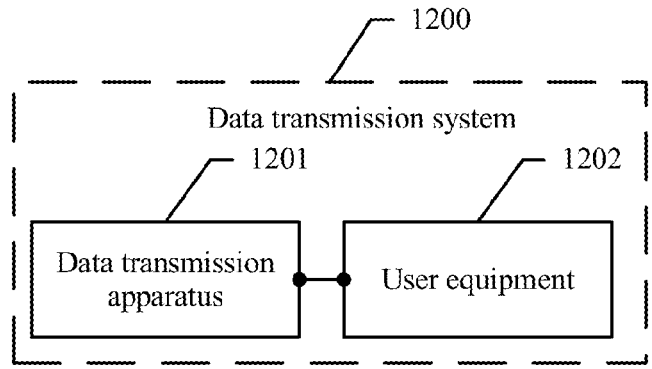
FIG. 12 is a schematic structural composition diagram of a data transmission system according to an embodiment of the present invention.

In the foregoing embodiments, a data transmission apparatus and user equipment that are provided in the embodiments of the present invention are described. In the following, a data transmission system provided in an embodiment of the present invention is described. Referring to FIG. 12, a data transmission system 1200 includes a data transmission apparatus 1201 and user equipment 1202. A connection is established between the data transmission apparatus 1201 and the user equipment 1202 in a communicable manner, for example, by using a wireless network.

The data transmission apparatus 1201 may be the data transmission apparatus 100 in FIG. 1-*a* and FIG. 1-*b*, and the user equipment 1202 is the user equipment 600 in FIG. 6; or the data transmission apparatus 1201 may be the data transmission apparatus 300 in FIG. 3-*a* and FIG. 3-*b*, and the user equipment 1202 is the user equipment 700 in FIG. 7; or the data transmission apparatus 1201 may be the data transmission apparatus 400 in FIG. 4, and the user equipment 1202 is the user equipment 800 in FIG. 8; or the data transmission apparatus 1201 may be the data transmission apparatus 500 in FIG. 5, and the user equipment 1202 is the user equipment 900 in FIG. 9.

In another embodiment of the present invention, the data transmission apparatus 1201 may be the data transmission apparatus 1000 in FIG. 10, and the user equipment 1202 is the user equipment 1100 in FIG. 11.

According to the data transmission system provided in the present embodiments, first, a data transmission apparatus determines configuration information of a first time unit in a radio time window. The first time unit includes multiple sub-time units, a switching time period and a transmission time period are reserved in a first sub-time unit at an interval of at least N sub-time units in the first time unit, and the switching time period is used to perform analog beam switching for a common channel and/or a common reference signal. Next, the data transmission apparatus transmits the common channel and/or the common reference signal in the first sub-time unit in the first time unit according to the configuration information of the first time unit, and transmits the common channel and/or the common reference signal in the transmission time period in the first sub-time unit. Because a switching time period in which analog beam switching can be performed is reserved in a first sub-time unit at an interval of at least N sub-time units in a first time unit in a radio time window, analog beam switching can be performed in the switching time period by adjusting virtual weighting of antenna elements. A common channel and/or a common reference channel are/is not transmitted in the switching time period but transmitted in a transmission time period in the first sub-time unit. Because the first sub-time unit to which a preset switching time period belongs is a sub-time unit at an interval of at least N sub-time units in the first time unit, there is no need to configure a switching time period in each sub-time unit in each time unit in the radio time window, so that resource waste can be avoided.

Figure 13:
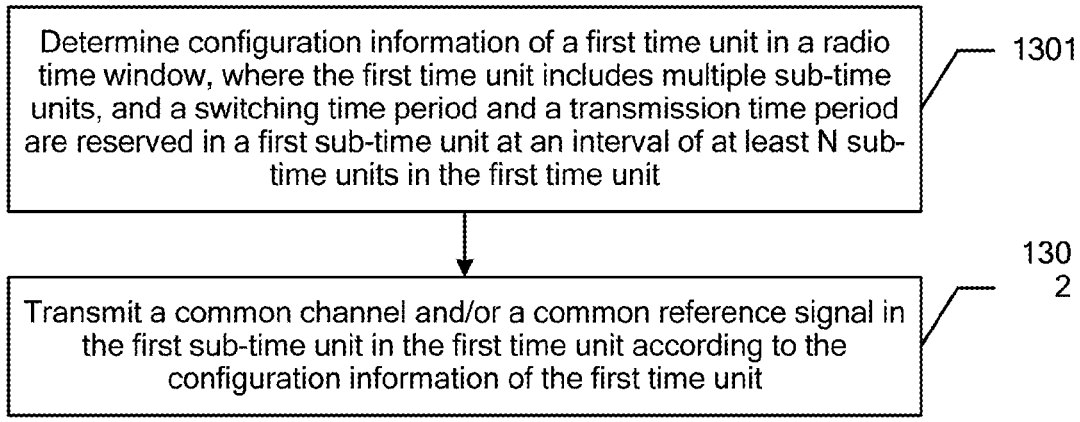
FIG. 13 is a schematic block flowchart of a data transmission method according to an embodiment of the present invention.

To better implement the solutions of the embodiments of the present invention, methods executed by the data transmission apparatus and the user equipment are further provided in the following, and are described in detail subsequently. An embodiment of a data transmission method in the present embodiments may be applied to a base station. Referring to FIG. 13, the data transmission method may include the following steps.

1301. Determine configuration information of a first time unit in a radio time window.

The first time unit includes multiple sub-time units, a switching time period and a transmission time period are reserved in a first sub-time unit at an interval of at least N sub-time units in the first time unit, the switching time period is used to perform analog beam switching for a common channel and/or a common reference signal, and N is a natural number.

1302. Transmit a common channel and/or a common reference signal in a first sub-time unit in the first time unit according to the configuration information of the first time unit.

The common channel and/or the common reference signal are/is transmitted in the transmission time period.

In some embodiments of the present invention, in addition to a manner described in the embodiment, the data transmission method may include the following steps.

A1. Determine configuration information of a second time unit in the radio time window, where the second time unit includes multiple sub-time units, the last M sub-time units are reserved in the second time unit to form a switching time period, the switching time period in the second time unit is used to perform analog beam switching for a traffic channel, and M is a natural number.

A2. Transmit the traffic channel in the second time unit according to the configuration information of the second time unit, where the traffic channel is transmitted in a sub-time unit other than the last M sub-time units in the second time unit.

In some embodiments of the present invention, in addition to a manner described in the embodiment, the data transmission method may include the following steps.

B1. Determine configuration information of a second time unit in the radio time window, where the second time unit includes multiple sub-time units, a switching time period and a transmission time period are reserved in the last sub-time unit in the second time unit, and the switching time period in the second time unit is used to perform analog beam switching for a traffic channel.

B2. Transmit the traffic channel in the second time unit according to the configuration information of the second time unit, where the traffic channel is transmitted in a sub-time unit other than the last sub-time unit in the second time unit and in the transmission time period in the last sub-time unit.

In some embodiments of the present invention, in addition to a manner described in the embodiment, the data transmission method may include the following step:

C1. Configure, for user equipment, a process for performing, in each sub-time unit in the first time unit, channel state information (CSI) measurement on a pilot resource.

It can be learned from the embodiment description about the present invention that, first, configuration information of a first time unit in a radio time window is determined. A switching time period and a transmission time period are reserved in a first sub-time unit at an interval of at least N sub-time units in the first time unit, and the switching time period is used to perform analog beam switching for a common channel and/or a common reference signal. Next, the common channel and/or the common reference signal are/is transmitted in the first sub-time unit in the first time unit according to the configuration information of the first time unit, and the common channel and/or the common reference signal are/is transmitted in the transmission time period in the first sub-time unit. Because a switching time period is reserved in a first sub-time unit at an interval of at least N sub-time units in a first time unit in a radio time window, and is used to perform analog beam switching, analog beam switching can be performed in the switching time period according to virtual weighting of antenna elements. A common channel and/or a common reference channel are/is not transmitted in the switching time period but transmitted in a transmission time period in the first sub-time unit. Because the first sub-time unit to which a preset switching time period belongs is selected at an interval of at least N sub-time units in the first time unit, there is no need to configure a switching time period in each sub-time unit in each time unit in the radio time window, so that resource waste can be avoided.

Figure 14:
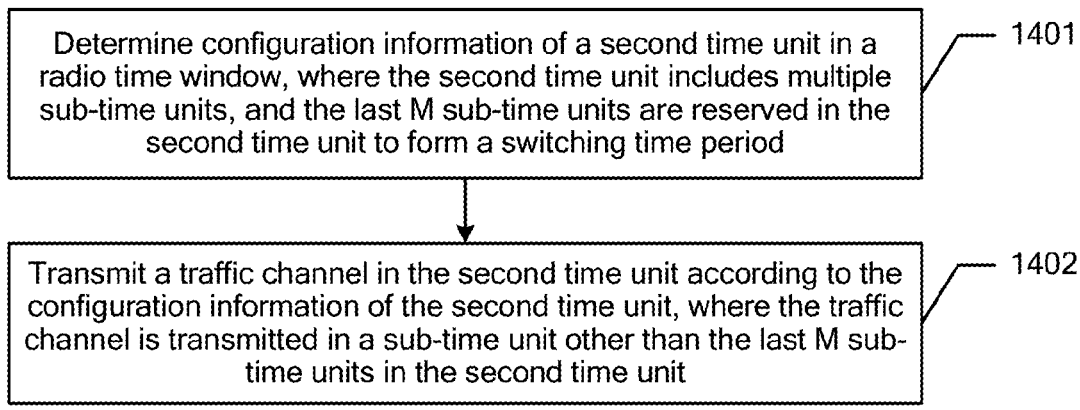
FIG. 14 is a schematic block flowchart of another data transmission method according to an embodiment of the present invention.

In the foregoing embodiment, a data transmission method provided in this embodiment of the present invention is described. In the following, another data transmission method provided in an embodiment of the present invention is described. Referring to FIG. 14, the method may mainly include the following steps.

1401. Determine configuration information of a second time unit in a radio time window, where the second time unit includes multiple sub-time units, the last M sub-time units are reserved in the second time unit to form a switching time period, the switching time period is used to perform analog beam switching for a traffic channel, and M is a natural number.

1402. Transmit the traffic channel in the second time unit according to the configuration information of the second time unit, where the traffic channel is transmitted in a sub-time unit other than the last M sub-time units in the second time unit.

Step 1401 and step 1402 are similar to step A1 and step A2 that are described in the foregoing embodiment. For specific description, refer to the foregoing embodiment. Details are not described herein again.

In some embodiments of the present invention, the switching time period for analog beam switching is the last M sub-time units in the second time unit in the radio time window, and a time length of the switching time period is determined according to a predefined switching time configuration index. For example, reference may be made to the description given by using an example of Table 2.

In some embodiments of the present invention, the configuration information of the second time unit includes a time configuration number of the second time unit, and the time configuration number is a configuration that is determined according to a configuration period and that is of the second time unit occupied in transmission of the traffic channel. For example, reference may be made to the description given by using an example of Table 1.

In some embodiments of the present invention, the configuration information of the second time unit is dynamically notified to user equipment by using downlink control signaling, or is notified to user equipment by using higher layer signaling. That is, to notify the user equipment of a configuration of a sub-time unit that is in the second time unit and is used to transmit the traffic channel, a base station may dynamically notify of the configuration information by using the downlink control signaling, or may semi-statically notify the user equipment of the configuration information by using the higher layer signaling. For example, the base station dynamically notifies the user equipment of the configuration information by adding the configuration information into the downlink control signaling, that is, dynamically notifies the user equipment of the configuration information of the second time unit by adding the configuration information of the second time unit into the downlink control signaling. The notification may also be 1-bit indication signaling (which indicates whether a current time unit is the second time unit). For another example, the base station may semi-statically configure the configuration information by using the higher layer signaling, and the semi-static configuration is longer-period configuration compared with fast dynamic configuration. Optionally, the configuration information of the second time unit may be semi-statically notified by using RRC signaling or other higher layer signaling. For example, i-bit higher layer signaling is used to notify whether a time unit is the second time unit, or the higher layer signaling is used to configure a set of second time units. The configuration may be in a form of a bitmap.

In some embodiments of the present invention, in addition to a manner described in the embodiment, the data transmission method may include the following steps.

D1. Determine configuration information of a first time unit in the radio time window, where the first time unit includes multiple sub-time units, a switching time period and a transmission time period are reserved in a first sub-time unit at an interval of at least N sub-time units in the first time unit, the switching time period is used to perform analog beam switching for a common channel and/or a common reference signal, and N is a natural number.

D2. Transmit the common channel and/or the common reference signal in the first sub-time unit in the first time unit according to the configuration information of the first time unit, where the common channel and/or the common reference signal are/is transmitted in the transmission time period in the first sub-time unit.

Step D1 and step D2 are similar to step 1301 and step 1302 that are described in the foregoing embodiment. For specific description, refer to the foregoing embodiment. Details are not described herein again.

It can be learned from the embodiment description about the present embodiments that, first, configuration information of a second time unit in a radio time window is determined. The last M sub-time units are reserved in the second time unit to form a switching time period, and the switching time period is used to perform analog beam switching for a traffic channel. Next, the traffic channel is transmitted in a sub-time unit other than the last M sub-time units in the second time unit according to the configuration information of the second time unit. Because the last M sub-time units are reserved in a second time unit in a radio time window, and are used to perform analog beam switching, analog beam switching can be performed in the switching time period according to virtual weighting of antenna elements. Because a preset switching time period includes the last M sub-time units in the second time unit, there is no need to configure a switching time period in each sub-time unit in the second time unit in the radio time window, so that resource waste can be avoided.

Figure 15:
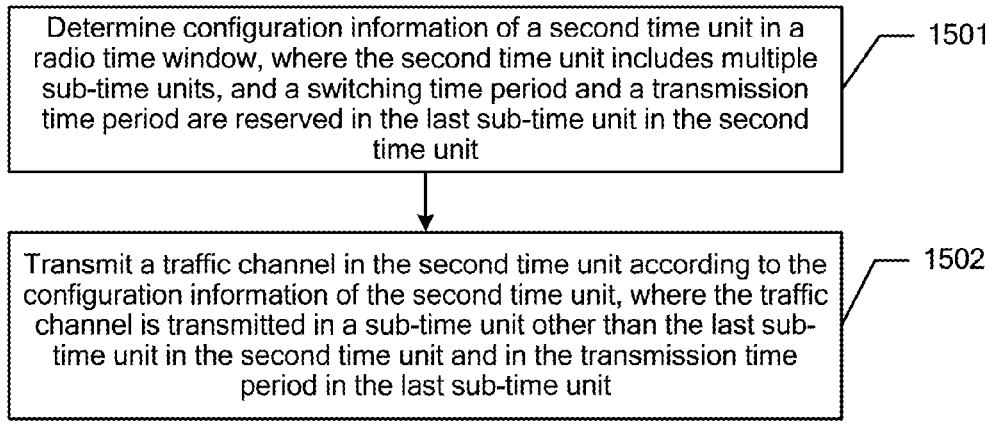
FIG. 15 is a schematic block flowchart of another data transmission method according to an embodiment of the present invention.

In the foregoing embodiment, a data transmission method provided in this embodiment of the present invention is described. In the following, another data transmission method provided in an embodiment of the present invention is described. The data transmission method is different from the data transmission method shown in FIG. 14. Specifically, referring to FIG. 15, the method may mainly include the following steps.

1501. Determine configuration information of a second time unit in a radio time window, where the second time unit includes multiple sub-time units, a switching time period and a transmission time period are reserved in the last sub-time unit in the second time unit, and the switching time period is used to perform analog beam switching for a traffic channel.

1502. Transmit the traffic channel in the second time unit according to the configuration information of the second time unit, where the traffic channel is transmitted in a sub-time unit other than the last sub-time unit in the second time unit and in the transmission time period in the last sub-time unit.

Step 1501 and step 1502 are similar to step B1 and step B2 that are described in the foregoing embodiment. For specific description, refer to the foregoing embodiment. Details are not described herein again.

In some embodiments of the present invention, the switching time period for analog beam switching is in the last sub-time unit in the second time unit in the radio time window, and a time length of the switching time period is determined according to a predefined switching time configuration index. For example, reference may be made to the description given by using an example of Table 2.

In some embodiments of the present invention, the configuration information of the second time unit includes a time configuration number of the second time unit, and the time configuration number is a configuration that is determined according to a configuration period and that is of the second time unit occupied in transmission of the traffic channel. For example, reference may be made to the description given by using an example of Table 1.

In some embodiments of the present invention, the configuration information of the second time unit is dynamically notified to user equipment by using downlink control signaling, or is notified to user equipment by using higher layer signaling. That is, to notify the user equipment of a configuration of a sub-time unit that is in the second time unit and is used to transmit the traffic channel, a base station may dynamically notify of the configuration information by using the downlink control signaling, or may semi-statically notify the user equipment of the configuration information by using the higher layer signaling. For example, the base station dynamically notifies the user equipment of the configuration information by adding the configuration information into the downlink control signaling, that is, dynamically notifies the user equipment of the configuration information of the second time unit by adding the configuration information of the second time unit into the downlink control signaling. The notification may also be 1-bit indication signaling (which indicates whether a current time unit is the second time unit). For another example, the base station may semi-statically configure the configuration information by using the higher layer signaling, and the semi-static configuration is longer-period configuration compared with fast dynamic configuration. Optionally, the configuration information of the second time unit may be semi-statically notified by using RRC signaling or other higher layer signaling. For example, 1-bit higher layer signaling is used to notify whether a time unit is the second time unit, or the higher layer signaling is used to configure a set of second time units. The configuration may be in a form of a bitmap.

In some embodiments of the present invention, in addition to a manner described in the embodiment, the data transmission method may include the following steps.

D1. Determine configuration information of a first time unit in the radio time window, where the first time unit includes multiple sub-time units, a switching time period and a transmission time period are reserved in a first sub-time unit at an interval of at least N sub-time units in the first time unit, the switching time period in the first sub-time unit is used to perform analog beam switching for a common channel and/or a common reference signal, and N is a natural number.

D2. Transmit the common channel and/or the common reference signal in the first sub-time unit in the first time unit according to the configuration information of the first time unit, where the common channel and/or the common reference signal are/is transmitted in the transmission time period in the first sub-time unit.

Step D1 and step D2 are similar to step 1301 and step 1302 that are described in the foregoing embodiment. For specific description, refer to the foregoing embodiment. Details are not described herein again.

It can be learned from the embodiment description about the present invention that, first, configuration information of a second time unit in a radio time window is determined. A switching time period and a transmission time period are reserved in the last sub-time unit in the second time unit, and the switching time period is used to perform analog beam switching. Next, transmission is performed in a sub-time unit other than the last sub-time unit in the second time unit and in the transmission time period in the last sub-time unit. Because a switching time period is reserved in the last sub-time unit in a second time unit in a radio time window, and is used to perform analog beam switching, analog beam switching can be performed in the switching time period according to virtual weighting of antenna elements. Because a preset switching time period includes the switching time period in the last sub-time unit in the second time unit, there is no need to configure a switching time period in each sub-time unit in the second time unit in the radio time window, so that resource waste can be avoided.

Figure 16:
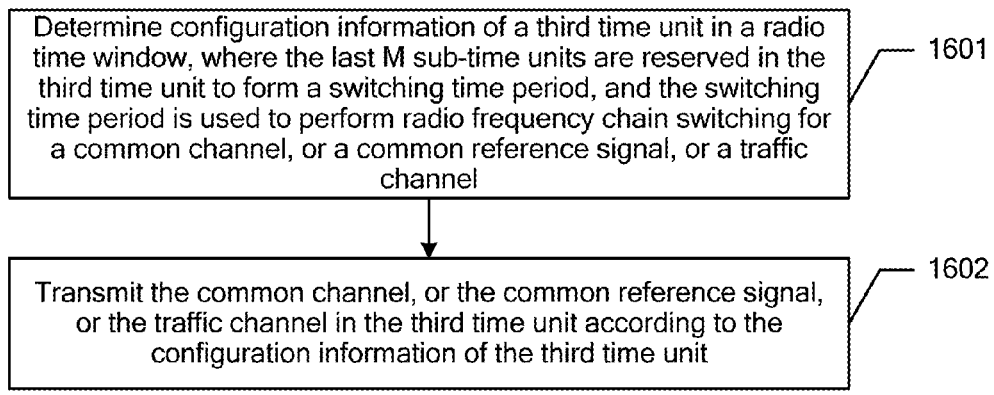
FIG. 16 is a schematic block flowchart of another data transmission method according to an embodiment of the present invention.

In the foregoing embodiment, a data transmission method provided in this embodiment of the present invention is described. In the following, another data transmission method provided in an embodiment of the present invention is described. Referring to FIG. 16, the method may mainly include the following steps.

1601. Determine configuration information of a third time unit in a radio time window.

The third time unit includes multiple sub-time units, the last M sub-time units are reserved in the third time unit to form a switching time period, the switching time period is used to perform analog beam switching for a common channel, or a common reference signal, or a traffic channel, and M is a natural number.

1602. Transmit the common channel, or the common reference signal, or the traffic channel in the third time unit according to the configuration information of the third time unit.

The common channel, or the common reference signal, or the traffic channel is transmitted in a sub-time unit other than the last M sub-time units in the third time unit.

In this embodiment of the present invention, data that needs to be transmitted in the radio time window is classified, and for different types of data, a switching time period configuration manner suitable for transmitting the data is used. The radio time window is a time domain resource used in transmitting a wireless signal. For example, with reference to a specific application scenario, a radio time window may be a wireless transmission time unit in a broad sense, or may be a specific transmission time unit such as a hyper frame, a radio frame in current LTE, a subframe, or a timeslot. All time units in each radio time window fall into three types. In addition to the first time unit and the second time unit that are described in the foregoing embodiment, each radio time window includes a type of time unit that is defined as the third time unit. The last M sub-time units are reserved in the third time unit to form the switching time period, and the switching time period is used to perform analog beam switching for the common channel, or the common reference signal, or the traffic channel. Analog beam switching described herein may be analog beam switching described in the foregoing embodiment. That is, the switching time period reserved in the third time unit may be used to perform analog beam switching.

For example, the radio time window is specifically a radio frame, the first time unit is specifically a first subframe, a sub-time unit is specifically a symbol in a subframe, and the third time unit is specifically a third subframe. Different from the first subframe and a second subframe, the third subframe is a subframe used to transmit the common channel, or the common reference signal, or the traffic channel. A time period does not need to be reserved in all symbols in the third subframe, to be used to perform analog beam switching. Instead, the last M symbols in each third subframe may be reserved, and used to perform analog beam switching. For example, when M is 2, only the last two symbols in each third subframe are reserved, and are used to perform analog beam switching. The common channel, or the common reference signal, or the traffic channel is transmitted in a symbol other than the last two symbols in the third subframe.

In step 1601, the last M sub-time units in the third time unit are used as the switching time period for analog beam switching, and the common channel, or the common reference signal, or the traffic channel is transmitted in the sub-time unit other than the last M sub-time units in the third time unit.

In some embodiments of the present invention, the switching time period for analog beam switching is the last M sub-time units in the third time unit in the radio time window, and a time length of the switching time period is determined according to a predefined switching time configuration index. For example, reference may be made to the description given by using an example of Table 2.

In some embodiments of the present invention, the configuration information of the third time unit includes a time configuration number of the third time unit, and the time configuration number is a configuration that is determined according to a configuration period and that is of the third time unit occupied in transmission of the common channel, or the common reference signal, or the traffic channel. For example, reference may be made to the description given by using an example of Table 1.

In some embodiments of the present invention, the configuration information of the third time unit is dynamically notified to user equipment by using downlink control signaling, or is notified to user equipment by using higher layer signaling. That is, to notify the user equipment of a configuration of a sub-time unit that is in the third time unit and is used to transmit the traffic channel, a base station may dynamically notify of the configuration information by using the downlink control signaling, or may semi-statically notify the user equipment of the configuration information by using the higher layer signaling. For example, the base station dynamically notifies the user equipment of the configuration information by adding the configuration information into the downlink control signaling, that is, dynamically notifies the user equipment of the configuration information of the third time unit by adding the configuration information of the third time unit into the downlink control signaling. The notification may also be 1-bit indication signaling (which indicates whether a current time unit is the third time unit). For another example, the base station may semi-statically configure the configuration information by using the higher layer signaling, and the semi-static configuration is longer-period configuration compared with fast dynamic configuration.

It can be learned from the embodiment description about the present embodiments that, first, configuration information of a third time unit in a radio time window is determined. The last M sub-time units are reserved in the third time unit to form a switching time period, and the switching time period is used to perform analog beam switching for a common channel, or a common reference signal, or a traffic channel. Next, the common channel, or the common reference signal, or the traffic channel is transmitted in a sub-time unit other than the last M sub-time units in the third time unit according to the configuration information of the third time unit. Because the last M sub-time units are reserved in a third time unit in a radio time window, and are used to perform analog beam switching, analog beam switching can be performed in the switching time period according to virtual weighting of antenna elements. Because a preset switching time period includes the last M sub-time units in the third time unit, there is no need to configure a switching time period in each sub-time unit in the third time unit in the radio time window, so that resource waste can be avoided.

Figure 17:
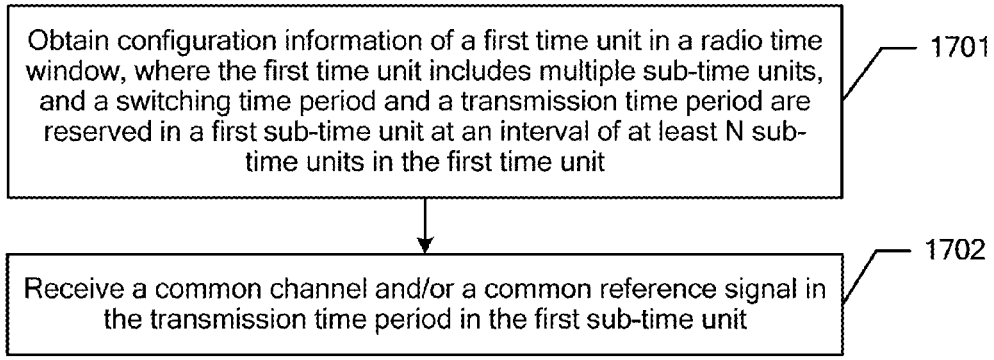
FIG. 17 is a schematic block flowchart of another data transmission method according to an embodiment of the present invention.

In the foregoing embodiment, a data transmission method provided in this embodiment of the present embodiments is described on a base station implementation side. In the following, another data transmission method provided in an embodiment of the present invention is described on a user equipment implementation side. Referring to FIG. 17, the method may mainly include the following steps.

1701. Obtain configuration information of a first time unit in a radio time window, where the first time unit includes multiple sub-time units, a switching time period and a transmission time period are reserved in a first sub-time unit at an interval of at least N sub-time units in the first time unit, the switching time period in the first time unit is used to perform analog beam switching for a common channel and/or a common reference signal, and N is a natural number.

1702. Receive the common channel and/or the common reference signal in the transmission time period in the first sub-time unit.

Specifically, step 1701 of obtaining configuration information of a first time unit in a radio time window includes: receiving the configuration information that is of the first time unit in the radio time window and is notified by using downlink control signaling or higher layer signaling.

For steps 1701 and 1702, the data transmission apparatus in the embodiment corresponding to FIG. 1-*a* and FIG. 1-*b*, executes the method. The data transmission apparatus determines the configuration information of the first time unit in the radio time window. The data transmission apparatus is located on a base station implementation side, and sends the configuration information of the first time unit in the radio time window to user equipment. For a specific implementation and function of the configuration information, refer to the description in the foregoing embodiment. The user equipment obtains configuration content of the configuration information by means of parsing, and determines that data is to be transmitted in the transmission time period in the first sub-time unit. Therefore, the user equipment needs to be able to receive the common channel and/or the common reference signal in the transmission time period. The user equipment avoids, by parsing the configuration information of the first time unit, the switching time period for analog beam switching, so as to correctly receive the common channel and/or the common reference signal.

Figure 18:
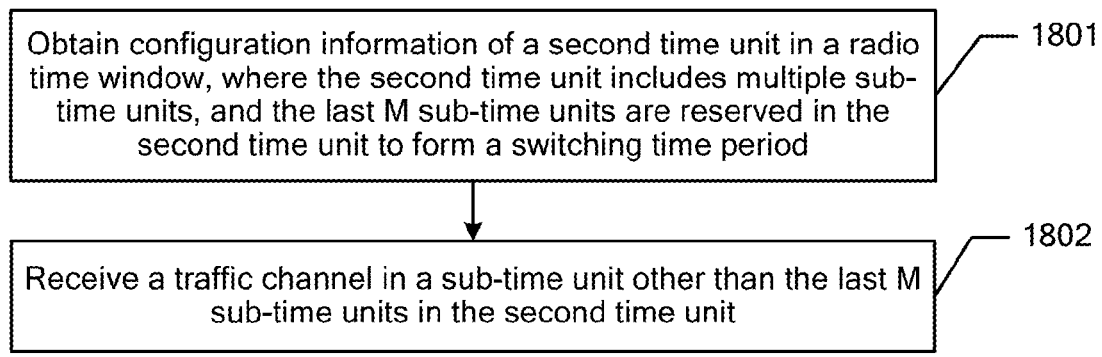
FIG. 18 is a schematic block flowchart of another data transmission method according to an embodiment of the present invention.

In the following, another data transmission method provided in an embodiment of the present invention is described on a user equipment implementation side. Referring to FIG. 18, the method may mainly include the following steps.

1801. Obtain configuration information of a second time unit in a radio time window, where the second time unit includes multiple sub-time units, the last M sub-time units are reserved in the second time unit to form a switching time period, the switching time period in the second time unit is used to perform analog beam switching for a traffic channel, and M is a natural number.

1802. Receive the traffic channel in a sub-time unit other than the last M sub-time units in the second time unit.

Specifically, step 1801 of obtaining configuration information of a second time unit in a radio time window includes: receiving the configuration information that is of the second time unit in the radio time window and is notified by using downlink control signaling or higher layer signaling.

For steps 1801 and 1802, the data transmission apparatus in the apparatus embodiment corresponding to FIG. 3-*a* and FIG. 3-*b* executes the method. The data transmission apparatus determines the configuration information of the second time unit in the radio time window. The data transmission apparatus is located on a base station implementation side, and sends the configuration information of the second time unit in the radio time window to user equipment. For a specific implementation and function of the configuration information, refer to the description in the foregoing embodiment. The user equipment obtains configuration content of the configuration information by means of parsing, and determines that data is to be transmitted in the sub-time unit other than the last M sub-time units in a second time unit. Therefore, the user equipment needs to be able to receive the traffic channel in the sub-time unit other than the last M sub-time units in the second time unit. The user equipment avoids, by parsing the configuration information of the second time unit, the switching time period for analog beam switching, so as to correctly receive the traffic channel.

Figure 19:
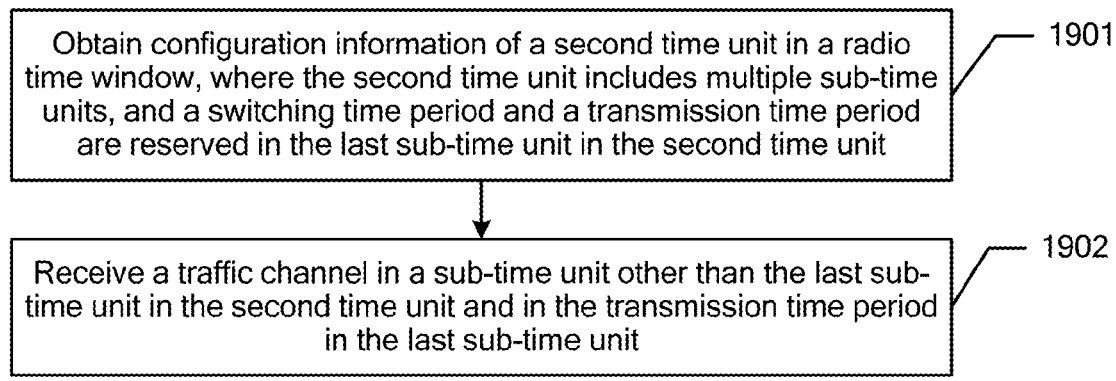
FIG. 19 is a schematic block flowchart of another data transmission method according to an embodiment of the present invention.

In the following, another data transmission method provided in an embodiment of the present invention is described on a user equipment implementation side. Referring to FIG. 19, the method may mainly include the following steps.

1901. Obtain configuration information of a second time unit in a radio time window, where the second time unit includes multiple sub-time units, a switching time period and a transmission time period are reserved in the last sub-time unit in the second time unit, and the switching time period in the second time unit is used to perform analog beam switching for a traffic channel.

1902. Receive the traffic channel in a sub-time unit other than the last sub-time unit in the second time unit and in the transmission time period in the last sub-time unit.

Specifically, step 1901 of obtaining configuration information of a second time unit in a radio time window includes: receiving the configuration information that is of the second time unit in the radio time window and is notified by using downlink control signaling or higher layer signaling.

For steps 1901 and 1902, the data transmission apparatus in the apparatus embodiment corresponding to FIG. 4 executes the method. The data transmission apparatus determines the configuration information of the second time unit in the radio time window. The data transmission apparatus is located on a base station implementation side, and sends the configuration information of the second time unit in the radio time window to user equipment. For a specific implementation and function of the configuration information, refer to the description in the foregoing embodiment. The user equipment obtains configuration content of the configuration information by means of parsing, and determines that data is to be transmitted in the sub-time unit other than the last sub-time unit in the second time unit and in the transmission time period other than the switching time period in the last sub-time unit. Therefore, the user equipment needs to be able to receive the traffic channel in the sub-time unit other than the last sub-time unit in the second time unit and in the transmission time period other than the switching time period in the last sub-time unit. The user equipment avoids, by parsing the configuration information of the second time unit, the switching time period for analog beam switching, so as to correctly receive the traffic channel.

It should be noted that, in the data transmission methods executed by the user equipment, the embodiment corresponding to steps 1701 and 1702, the embodiment corresponding to steps 1801 and 1802, and the embodiment corresponding to steps 1901 and 1902 may be implemented independently, or may be implemented by combining with each other. For example, the embodiment corresponding to steps 1701 and 1702 and the embodiment corresponding to steps 1801 and 1802 may be combined, so as to receive the common channel and/or the common reference signal and the traffic channel. The embodiment corresponding to steps 1701 and 1702 and the embodiment corresponding to steps 1901 and 1902 may be combined, so as to receive the common channel and/or the common reference signal and the traffic channel. Details are not further described herein one by one.

Figure 20:
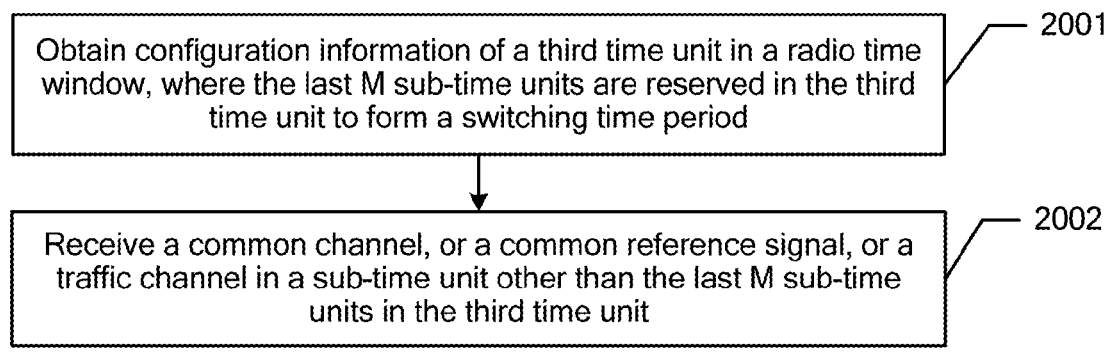
FIG. 20 is a schematic block flowchart of another data transmission method according to an embodiment of the present invention.

In the following, another data transmission method provided in an embodiment of the present invention is described on a user equipment implementation side. Referring to FIG. 20, the method may mainly include the following steps.

2001. Obtain configuration information of a third time unit in a radio time window, where the last M sub-time units are reserved in the third time unit to form a switching time period, the switching time period is used to perform analog beam switching for a common channel, or a common reference signal, or a traffic channel, and M is a natural number.

2002. Receive the common channel, or the common reference signal, or the traffic channel in a sub-time unit other than the last M sub-time units in the third time unit.

Specifically, step 2001 of obtaining configuration information of a third time unit in a radio time window includes: receiving the configuration information that is of the third time unit in the radio time window and is notified by using downlink control signaling or higher layer signaling.

For steps 2001 and 2002, the data transmission apparatus in the apparatus embodiment corresponding to FIG. 5 executes the method. The data transmission apparatus determines the configuration information of the third time unit in the radio time window. The data transmission apparatus is located on a base station implementation side, and sends the configuration information of the third time unit in the radio time window to user equipment. For a specific implementation and function of the configuration information, refer to the description in the foregoing embodiment. The user equipment obtains configuration content of the configuration information by means of parsing, and determines that data is to be transmitted in the sub-time unit other than the last M sub-time units in the third time unit. Therefore, the user equipment needs to be able to receive the common channel, or the common reference signal, or the traffic channel in the sub-time unit other than the last M sub-time units in the third time unit. The user equipment avoids, by parsing the configuration information of the third time unit, the switching time period for analog beam switching, so as to correctly receive the common channel, or the common reference signal, or the traffic channel.

It can be learned from the embodiment description about the present invention that, a data transmission apparatus determines configuration information of a first time unit in a radio time window. The data transmission apparatus is located on a base station implementation side, and sends the configuration information of the first time unit in the radio time window to user equipment. For a specific implementation and function of the configuration information, refer to the description in the foregoing embodiment. The user equipment obtains configuration content of the configuration information by means of parsing, and determines that data is to be transmitted in a transmission time period in a first sub-time unit. Therefore, the user equipment needs to be able to receive a common channel and/or a common reference signal in the transmission time period. The user equipment avoids, by parsing the configuration information of the first time unit, a switching time period for analog beam switching, so as to correctly receive the common channel and/or the common reference signal.

In addition, it should be noted that, the described apparatus embodiment is only an example. The units described as separate parts may or may not be physically separate, and parts displayed as units may or may not be physical units, may be located in one position, or may be distributed on multiple network units. Some or all of the modules may be selected according to actual needs to achieve the objectives of the solutions of the embodiments. In addition, in the accompanying drawings of the apparatus embodiments provided in the present embodiments, connection relationships between modules indicate that the modules have communication connections with each other, and may be specifically implemented as one or more communications buses or signal cables. Persons of ordinary skill in the art may understand and implement the embodiments of the present invention without creative efforts.

Based on the description of the implementations, persons skilled in the art may clearly understand that the present embodiments may be implemented by software in addition to necessary universal hardware, or by dedicated hardware, including a dedicated integrated circuit, a dedicated CPU, a dedicated memory, a dedicated component, and the like. Generally, any function that can be performed by a computer program can be easily implemented by using corresponding hardware. Moreover, a specific hardware structure used to achieve a same function may be of various forms, for example, in a form of an analog circuit, a digital circuit, a dedicated circuit, or the like. However, as for the present embodiments, software program implementation is a better implementation in most cases. Based on such an understanding, the technical solutions of the present embodiments essentially or the part contributing to the prior art may be implemented in a form of a software product. The computer software product may be stored in a readable storage medium, such as a floppy disk, a universal serial bus (USB) flash drive, a removable hard disk, a read-only memory (ROM), a random access memory (RAM), a magnetic disk, or an optical disc of a computer, and includes several instructions for instructing a computer device (which may be a personal computer, a server, a network device, or the like) to perform the methods described in the embodiments of the present invention.

In conclusion, the embodiments are only intended for describing the technical solutions of the present embodiments, but not for limiting the present embodiments. Although the present embodiments are described in detail with reference to the embodiments, persons of ordinary skill in the art should understand that they may still make modifications to the technical solutions described in the embodiments or make equivalent replacements to some technical features thereof, without departing from the spirit and scope of the technical solutions of the embodiments of the present invention.

What is claimed is:

1. A data transmission apparatus, comprising:
    a processor; and
    a non-transitory computer readable storage medium storing a program for execution by the processor, the program including instructions to:
        determine configuration information of a first time unit in a radio time window, wherein the first time unit comprises multiple sub-time units, wherein a switching time period and a transmission time period are reserved in a first sub-time unit of the first time unit at an interval of at least N sub-time units, wherein the switching time period is for analog beam switching for a common channel or a common reference signal, and wherein N is a natural number; and
        transmit the common channel or the common reference signal in the first sub-time unit of the first time unit according to the configuration information of the first time unit, wherein the common channel or the common reference signal is transmitted in the transmission time period.

2. The data transmission apparatus according to claim 1, wherein N is a quantity of sub-time units in the first time unit that are occupied by the common channel or by the common reference signal in times of transmission in the first time unit.

3. The data transmission apparatus according to claim 1, wherein the first sub-time unit comprises the switching time period, the transmission time period, and a cyclic prefix time period.

4. The data transmission apparatus according to claim 3, wherein the switching time period in the first sub-time unit is obtained by replacing a cyclic prefix (CP) of the common channel or a CP of the common reference signal; or
    wherein the cyclic prefix time period is used to transmit the CP of the common channel or the CP of the common reference signal.

5. The data transmission apparatus according to claim 1, wherein the instructions further comprise instructions to:
    determine configuration information of a second time unit in the radio time window, wherein the second time unit comprises multiple sub-time units, wherein a switching time period and a transmission time period are reserved in a last sub-time unit in the second time unit, and wherein the switching time period in the second time unit is for analog beam switching for a traffic channel; and
    transmit the traffic channel in the second time unit according to the configuration information of the second time unit, wherein the traffic channel is transmitted in a sub-time unit other than the last sub-time unit in the second time unit, and wherein the traffic channel is transmitted in the transmission time period in the last sub-time unit.

6. The data transmission apparatus according to claim 5, wherein a time period length of the transmission time period in the last sub-time unit in the second time unit is less than or equal to a length of a time period for transmitting the traffic channel.

7. The data transmission apparatus according to claim 5, wherein a quantity of the multiple sub-time units in the second time unit is greater than or equal to a quantity of the multiple sub-time units in the first time unit.

8. The data transmission apparatus according to claim 1, wherein the instructions further comprise instructions to:
    configure, for a user equipment, a process of performing, in the multiple sub-time units in the first time unit, channel state information measurements on a pilot resource.

9. A user equipment, comprising:
    a processor; and
    a non-transitory computer readable storage medium storing a program for execution by the processor, the program including instructions to:
        obtain configuration information of a first time unit in a radio time window, wherein the first time unit comprises multiple sub-time units, wherein a switching time period and a transmission time period are reserved in a first sub-time unit of the first time unit at an interval of at least N sub-time units in the first time unit, wherein the switching time period is for analog beam switching for a common channel or for a common reference signal, and wherein N is a natural number;
        avoid, according to the configuration information, receiving a signal from a base station in the switching time period of the first time unit; and
        receive the common channel or the common reference signal in the transmission time period, wherein the common channel or the common reference signal is transmitted by the base station in the first sub-time unit of the first time unit according to the configuration information of the first time unit.

10. The user equipment according to claim 9, wherein the instructions further comprise instructions to:
    obtain configuration information of a second time unit in the radio time window, wherein the second time unit comprises multiple sub-time units, wherein the last M sub-time units are reserved in the second time unit for a switching time period, wherein the switching time period in the second time unit is for analog beam switching for a traffic channel, and wherein M is a natural number; and
    receive the traffic channel in a sub-time unit other than the last M sub-time units in the second time unit.

11. The user equipment according to claim 9, wherein the instructions further comprise instructions to:
    to obtain configuration information of a second time unit in the radio time window, wherein the second time unit comprises multiple sub-time units, wherein a switching time period and a transmission time period are reserved in the last sub-time unit in the second time unit, and wherein the switching time period in the second time unit is for analog beam switching for a traffic channel; and receive the traffic channel in a sub-time unit other than the last sub-time unit in the second time unit, and receive the traffic channel in the transmission time period in the last sub-time unit.

12. The user equipment according to claim 11, wherein the instructions further comprise instructions to:
receive the configuration information of the first time unit in the radio time window, using downlink control signaling or higher layer signaling; and
receive the configuration information of the second time unit in the radio time window using downlink control signaling or higher layer signaling.

13. A method comprising:
determining, by a data transmission apparatus, configuration information of a first time unit in a radio time window, wherein the first time unit comprises multiple sub-time units, wherein a switching time period and a transmission time period are reserved in a first sub-time unit of the first time unit at an interval of at least N sub-time units, wherein the switching time period is for analog beam switching for a common channel or for a common reference signal, and wherein N is a natural number; and
transmitting, by the data transmission apparatus, the common channel or the common reference signal in the first sub-time unit in the first time unit according to the configuration information of the first time unit, wherein the common channel or the common reference signal is transmitted in the transmission time period.

14. The method according to claim 13, wherein N is a quantity of sub-time units in the first time unit that are occupied by the common channel or by the common reference signal in times of transmission in the first time unit.

15. The method according to claim 13, wherein the first sub-time unit comprises the switching time period, the transmission time period, and a cyclic prefix time period.

16. The method according to claim 15, wherein the switching time period in the first sub-time unit is obtained by replacing a cyclic prefix (CP) of the common channel or of the common reference signal; or
wherein the cyclic prefix time period is used to transmit the CP of the common channel or of the common reference signal.

17. The method according to claim 13, wherein the method further comprises:
determining configuration information of a second time unit in the radio time window, wherein the second time unit comprises multiple sub-time units, wherein a switching time period and a transmission time period are reserved in the last sub-time unit in the second time unit, and wherein the switching time period in the second time unit is for analog beam switching for a traffic channel; and
transmitting the traffic channel in the second time unit according to the configuration information of the second time unit, wherein the traffic channel is transmitted in a sub-time unit other than the last sub-time unit in the second time unit, and wherein the traffic channel is transmitted in the transmission time period in the last sub-time unit.

18. The method according to claim 17, wherein a time period length of the transmission time period in the last sub-time unit in the second time unit is less than or equal to a length of a time period that is used to transmit the traffic channel.

19. The method according to claim 17, wherein a quantity of sub-time units in the second time unit is greater than or equal to a quantity of sub-time units in the first time unit.

20. The method according to claim 13, wherein the method further comprises:
configuring, for a user equipment, a process of performing, in each sub-time unit in the first time unit, channel state information measurement on a pilot resource.

* * * * *